(12) United States Patent
Prakash et al.

(10) Patent No.: US 10,745,066 B2
(45) Date of Patent: Aug. 18, 2020

(54) APPARATUS AND METHOD FOR REDUCING AERODYNAMIC DRAG ON TRACTOR-TRAILERS

(71) Applicant: Ohio State Innovation Foundation, Columbus, OH (US)

(72) Inventors: Shaurya Prakash, Columbus, OH (US); Kaushik Krishna Rangharajan, Columbus, OH (US); Zachary Zezinka, Naperville, IL (US); Joseph D. West, Richwood, OH (US); Albert Terrence Conlisk, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 69 days.

(21) Appl. No.: 16/142,706

(22) Filed: Sep. 26, 2018

(65) Prior Publication Data
US 2019/0092401 A1   Mar. 28, 2019

Related U.S. Application Data

(60) Provisional application No. 62/563,355, filed on Sep. 26, 2017.

(51) Int. Cl.
*B62D 35/00* (2006.01)
*F15D 1/12* (2006.01)

(52) U.S. Cl.
CPC ............. *B62D 35/001* (2013.01); *F15D 1/12* (2013.01)

(58) Field of Classification Search
CPC ................................ B62D 35/001; F15D 1/12
See application file for complete search history.

(56) References Cited

U.S. PATENT DOCUMENTS

| 4,978,162 A | 12/1990 | Labbe |
| 6,224,141 B1 | 5/2001 | Brodlo |
| (Continued) | | |

FOREIGN PATENT DOCUMENTS

| DE | 102010027717 A1 | 3/2011 |
| DE | 102015210500 A1 | 12/2016 |
| GB | 2481434 A | 12/2011 |

OTHER PUBLICATIONS

European Patent Office, International Search Report and Written Opinion issued in corresponding PCT Application No. PCT/US2018/052893, dated Jan. 14, 2019 (17 pages).

*Primary Examiner* — D Glenn Dayoan
*Assistant Examiner* — Melissa A Black
(74) *Attorney, Agent, or Firm* — Wood Herron & Evans LLP

(57) ABSTRACT

An apparatus for reducing aerodynamic drag on a tractor-trailer includes a panel configured to extend along a length of the trailer, the panel having first and second ends and being contoured along a lengthwise direction of the panel from the first end to the second end. Another apparatus includes a panel including a base and an array of rib-like protrusions extending outwardly from the base. Another apparatus includes a panel including an inner portion and an outer portion coupled to each other along first and second seams to define a cavity and including an air inlet for allowing air influx into the cavity from free-stream air flow during transit of the tractor-trailer to transition the panel from a retracted state to a deployed state. When in the deployed state, the panel is configured to alter an external topography of the tractor-trailer.

17 Claims, 25 Drawing Sheets

(56) References Cited

U.S. PATENT DOCUMENTS

2016/0052566 A1* 2/2016 Bacon .................. B62D 35/001
                                                        296/180.4
2016/0214660 A1   7/2016 Conny
2018/0154951 A1   7/2018 Schmidt et al.

* cited by examiner

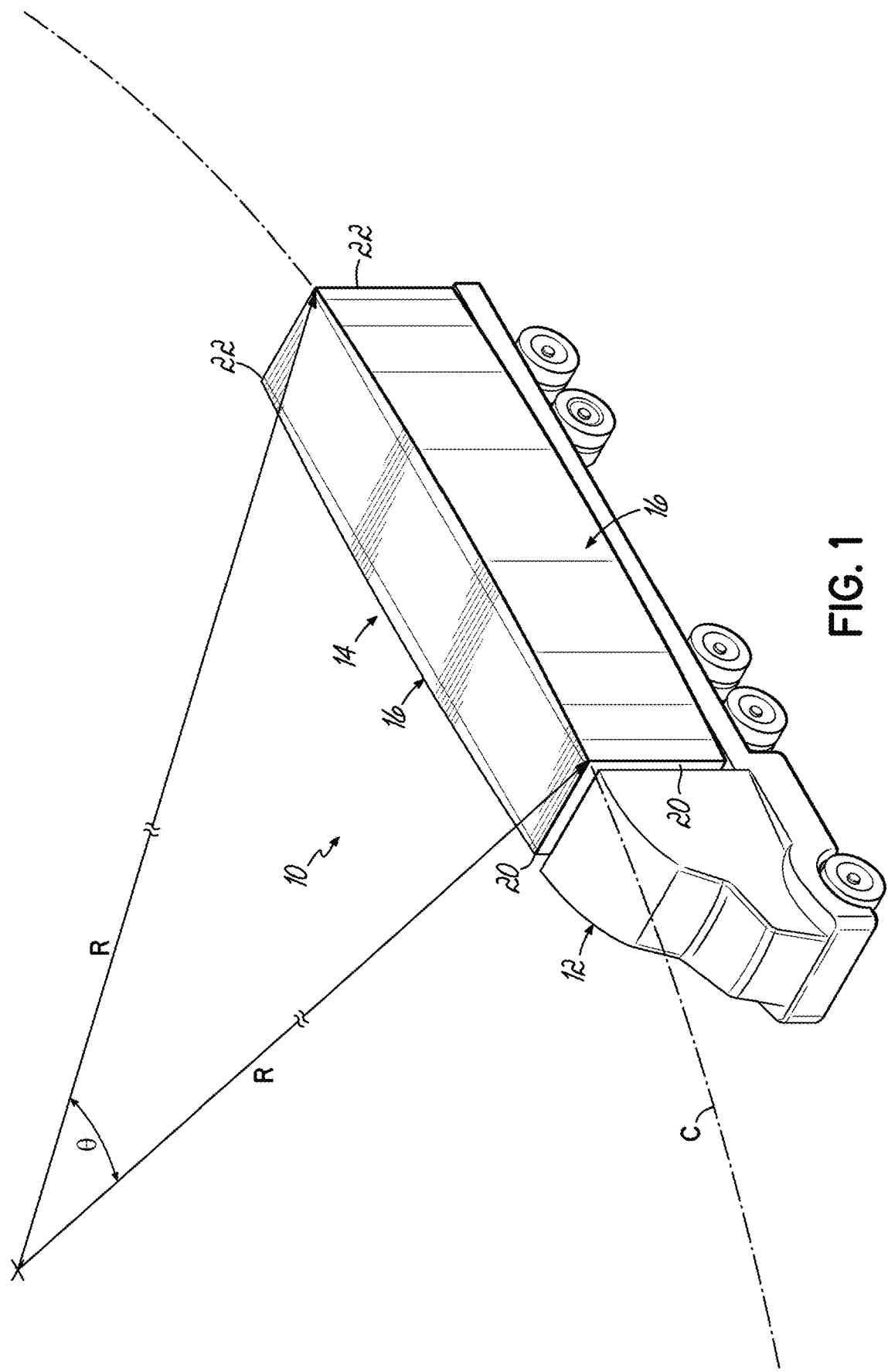

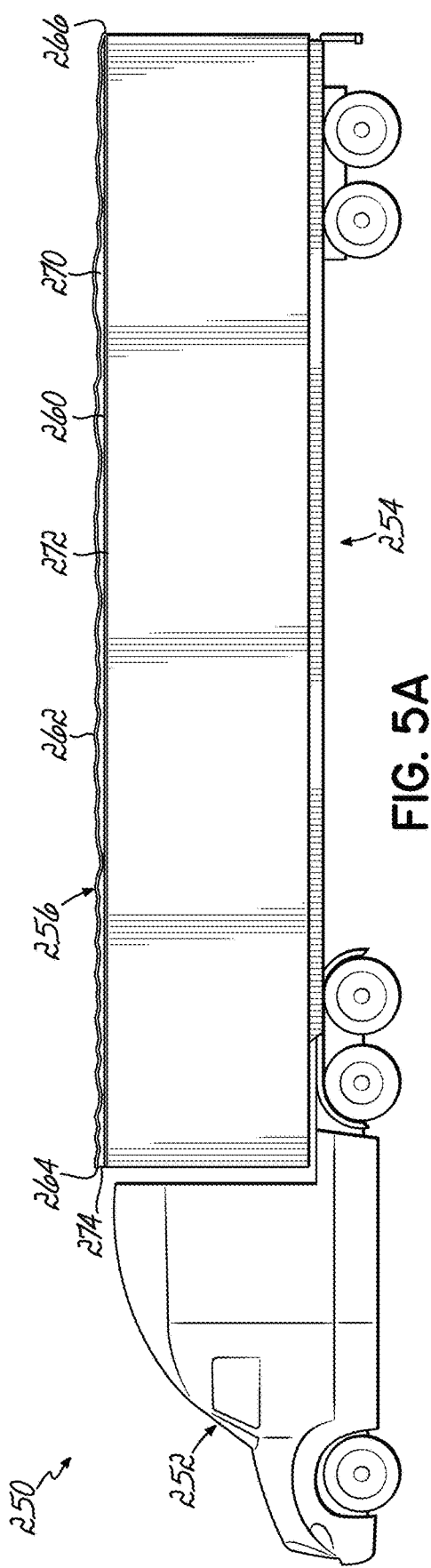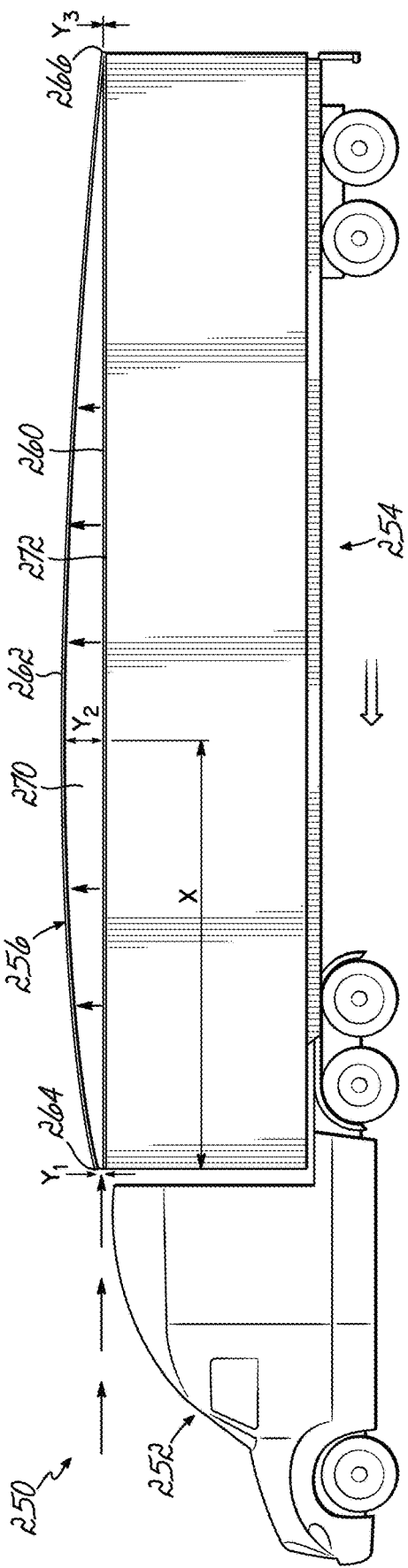
FIG. 5A
FIG. 5B

APPARATUS AND METHOD FOR REDUCING AERODYNAMIC DRAG ON TRACTOR-TRAILERS

CROSS REFERENCE TO RELATED APPLICATION

This application claims the benefit of U.S. Provisional Application Ser. No. 62/563,355, filed on Sep. 26, 2017, the disclosure of which is incorporated by reference in its entirety.

TECHNICAL FIELD

The invention generally relates to tractor-trailers and, more particularly, to apparatuses and methods for reducing aerodynamic drag on tractor-trailers.

BACKGROUND

Heavy duty trucks transport over 85% of the total value of goods and thus play an essential role in the United States (U.S.) economy. This mode of transporting goods occurs globally with continued increase over the last 30 years; thus requiring intense demand for fossil fuel consumption to support the trucking industry. In recent times (e.g., 2011 to 2015), yearly sales of class 8 (heavy duty) trucks in the U.S. have increased from ~171,000 to ~250,000/year. For ground fleet vehicles powered by fossil fuels, fluctuations in fuel prices and usage determine efficacy of this mode of transport. Unpredictability in fuel price coupled with global efforts in reducing greenhouse emissions combined with limited implementation of biofuels and renewable energy resources has driven the demand for achieving significantly enhanced fuel efficiency in ground fleet vehicles. An energy audit of class 8 trucks indicates that 60% of all dissipative energy losses occur in the engine, with aerodynamic losses accounting for 21%, rolling resistance contributing 13%, and drive-train and auxiliary losses adding another 6%. Out of these four mechanisms contributing to dissipative losses, this application focuses on adding bio-inspired retrofits to class 8 trucks for reducing aerodynamic losses.

A tractor-trailer moving at highway speeds of 25-31 m/s (55-70 miles per hour, mph) involves the interaction of a fluid (air) with a structure (tractor-trailer) resulting in drag force. Simply put, drag force is the resistance an object must overcome while moving through a fluid. As the air goes over the tractor-trailer, the flow profile deviates significantly from free-stream or the velocity far-away from the tractor-trailer. At the tractor front, the incoming air-stream stagnates, leading to an enhanced pressure called stagnation pressure, which is the sum of dynamic and free-stream pressure. Tires present in both the tractor and the trailer, in addition to gap in-between the tractor-trailer, act as a region of flow separation causing local flow reversal in these areas adding drag. Trailer underskirts have been implemented to minimize generation of flow eddies and thereby reduce the drag energy losses due to interacting vortices.

The flow region behind the tractor-trailer is known as the wake. As the airflow approaches the wake, a pressure drop below the ambient pressure is experienced in order to bend the flow just behind the wake, adding additional drag to the moving vehicle. Moreover, flow separation causes significant pressure drop in the wake, preventing pressure recovery and contributing to aerodynamic drag. The total aerodynamic drag for a truck is therefore, a summation of resistance due to skin friction and pressure drag (drag force, $F_D$), and is geometry dependent. In particular, various design considerations for trucks consider design of the front vehicle facade along with the front spoiler, the angle of inclination of the rear window, and the geometry of the vehicle rear. At highway speeds, in comparison to skin friction, pressure drag contributes almost 90% of the total aerodynamic drag. In the context of fuel efficiency, previous work has shown that an estimated 2-3% in fuel savings can be achieved by reducing the overall aerodynamic losses by 5%.

Evaluating the impact of 5% reduction in overall aerodynamic losses to generate approximately 3% in fuel savings requires consideration of the fuel economies for large ground fleet vehicles. Fuel economy of class 8 trucks at 29 m/s (65 mph), depending on their weight range (10,000 to 36,000 kg) is estimated to be between 2.5-3.4 km/l (6-8 miles per gallon (mpg)). Therefore, average invested fuel costs, for a class 8 truck based on a 112,000 km (70,000-mile) annual mileage is $22,000-$30,000, based on $2.6 per gallon of diesel. Given that more than 2.5 million heavy duty trucks are registered in the United States, a 3% enhancement in fuel efficiency (raising consumptive fuel mileage ratio to 6.2-8.3 mpg) via 5% reduction in aerodynamic drag can result in net savings of ~$1.6-$2.2 billion annually in the heavy duty truck transportation sector.

Furthermore, the National Highway Traffic Safety Administration (NHTSA) has set new emission rules to achieve a 17% reduction in greenhouse gas emissions for heavy duty-vehicles by 2018, furthering the need for sustained and substantial efforts to enhance fuel efficiency with aerodynamic drag reduction, providing an impactful domain to target. Prior efforts to reduce drag have led to two classes of aerodynamic drag reduction devices: first- and second-generation aerodynamic drag reduction devices. The first-generation devices focused on cab-mounted air fairings, side extenders, deflectors and front-end rounding, resulted in relative decrease in drag of a ~15-31%, in comparison to when no external devices were added. The second-generation devices consisted of base flaps, trailer skirts, and tractor-trailer gap sealers, further decreasing drag by 3-15%. A comprehensive review of previous experimental efforts to minimize drag for full scale and sub-scale efforts was reported previously. Over the past decade or so, reduction in drag coefficient from 0.79 (no devices) to 0.57 was achieved with addition of several first and second-generation devices to full-scale trucks when tested inside a wind tunnel.

The trailer constitutes up to ~70-80% of total length of a class 8 truck and provides the largest surface area for the vehicle. Despite this large structure, the trailer has seen minimal exploration for technologies towards drag reduction. Accordingly, there is a need for redesigning the trailer towards potential savings in aerodynamic drag.

SUMMARY

In one embodiment, an apparatus for reducing aerodynamic drag on a tractor-trailer includes a panel configured to extend along a length of the trailer, the panel having first and second ends and being contoured along a lengthwise direction of the panel from the first end to the second end. The contoured profile may be defined by a shape of partial circumference of a circle of constant radius of curvature. For example, the radius of curvature may be between approximately 83 m and approximately 84 m. In one embodiment, a trailer includes the apparatus.

In another embodiment, an apparatus for reducing aerodynamic drag on a tractor-trailer includes a panel configured to extend along a length of the trailer, the panel including a base extending between first and second ends and further including an array of rib-like protrusions extending outwardly from the base. The panel may include approximately 25 rows of the protrusions. In addition or alternatively, the features may each have a length, a width, and a height, and the lengths of the protrusions may be greater than the respective widths and heights. For example, the lengths of the protrusions may be between approximately 0.4 m and approximately 0.42 m and the heights of the protrusions may be between approximately 0.092 m and approximately 0.105 m. In addition or alternatively, the protrusions may extend outwardly from the base by between approximately 0.07 m and approximately 0.084 m. The base may be contoured along a lengthwise direction of the base from the first end to the second end. In one embodiment, a trailer includes the apparatus.

In another embodiment, an apparatus for reducing aerodynamic drag on a tractor-trailer includes a panel including an inner portion and an outer portion coupled to each other along first and second seams to define a cavity and further including at least one air inlet proximate at least one of the first or second seams for allowing air influx into the cavity from free-stream air flow during transit of the tractor-trailer to transition the panel from a retracted state to a deployed state. When in the deployed state, the panel is configured to alter an external topography of the tractor-trailer. When in the deployed state, the outer portion of the panel may be contoured along a lengthwise direction of the panel. In one embodiment, a trailer includes the apparatus.

In yet another embodiment, a trailer includes a plurality of walls extending between respective front and rear ends and at least partially defining an interior cargo space. The trailer also includes at least one panel coupled to at least one of the walls and spaced apart therefrom to define at least one cavity and at least one air inlet proximate at least one of the respective front ends for allowing air influx into the at least one cavity from free-stream air flow during transit of the tractor-trailer to transition the respective at least one panel from a retracted state to a deployed state. When in the deployed state, the at least one panel is configured to alter at least one external topography of the trailer without changing the interior cargo space. When in the deployed state, the panel may be contoured along a lengthwise direction of the panel. In addition or alternatively, the at least one panel may include first and second side panels coupled to first and second sidewalls of the plurality of walls and spaced apart therefrom to define first and second side cavities, and the at least one panel may further include a top panel coupled to a top wall of the plurality of walls and spaced apart therefrom to define a top cavity and the at least one air inlet proximate the front end of the top wall. In one embodiment, the top panel is spaced apart from the top wall proximate the front end of the top wall by at least one standoff protruding outwardly from the top wall. The trailer may further include a front strap extending around the sidewalls and the at least one standoff proximate the respective front ends, wherein the side panels and the top panel are each coupled to the front strap. The trailer may also include a rear strap extending around the sidewalls and the top wall proximate the respective rear ends, wherein the side panels and the top panel are each coupled to the rear strap to inhibit air outflux from the respective cavities.

BRIEF DESCRIPTION OF THE DRAWINGS

The accompanying drawings, which are incorporated in and constitute a part of this specification, illustrate various embodiment of the invention and, together with the general description of the invention given above, and the detailed description of the embodiments given below, serve to explain the embodiments of the invention.

FIG. 1 is a schematic view of a tractor-trailer including an exemplary aerodynamic panel in accordance with an aspect of the invention.

FIG. 5A is a schematic view of a tractor-trailer including another exemplary aerodynamic panel in accordance with an aspect of the invention, showing the panel in a flaccid or retracted state.

FIG. 5B is a schematic view similar to FIG. 5A, showing the panel in an inflated or deployed state.

DETAILED DESCRIPTION

Figure 1A:
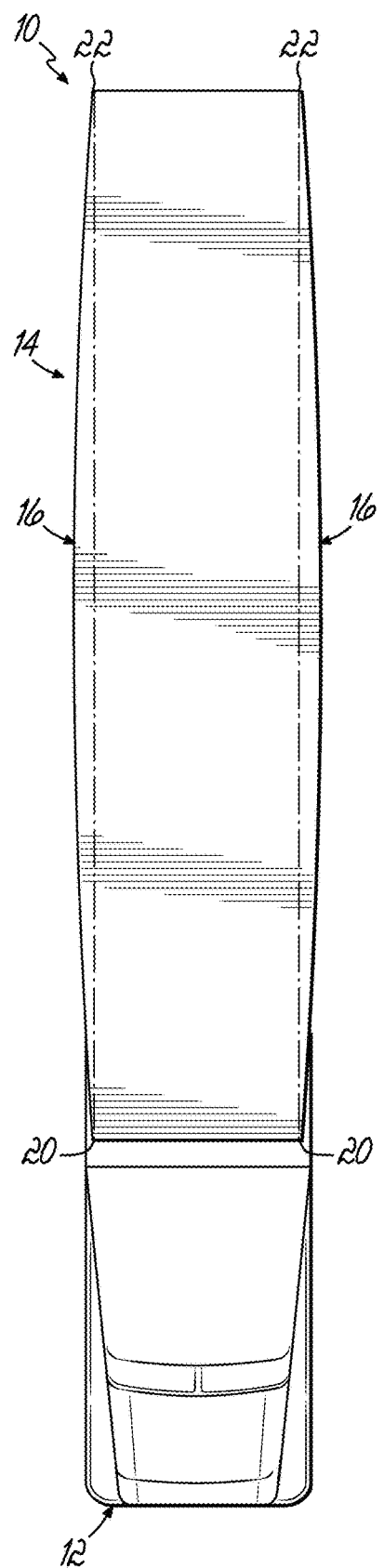
FIG. 1A is a top view of the tractor-trailer of FIG. 1.

Embodiments of the invention are directed to apparatuses and methods for reducing aerodynamic drag on tractor-trailers.

The disclosed designs for trailer modifications were inspired by biological systems, that showcase a variety of geometrical structures that are critical to biological function but also provide added benefits for reducing drag or harnessing flow energy. For example, the boxfish (*Ostracion meleagris*) has a natural streamlined form with squared-off contours, providing a lower pressure drag which gives it the ability to swim up to six body lengths per second. Similarly, Mako sharks (*Isurus oxyrinchus*), which are one of the fastest marine creatures travel up to 22 mph (9.8 m/s) in water, causing turbulent flow of water around their bodies. In addition to their native streamlined shape, the longitudinal scales on the shark-skin surface reduce the wall shear stress and boundary layer separation causing water to move more efficiently around the shark when compared to the case when the scales were absent.

To take advantage and translate the hydrodynamic drag reduction found in fish towards reducing the aerodynamic drag of a tractor-trailer, equivalence in Reynolds number (Re) was identified.

$$Re = \frac{\rho u_{free} l_c}{\mu}.$$

Where, $\rho$, $u_{free}$, $\mu$, $l_c$ are the fluid density, free stream velocity, viscosity, and characteristic length respectively. Air, like water, is also a fluid and Re directly relates the equivalent ratio of inertial to viscous forces as indicated in the non-dimensional form of Navier-Stokes equation, which is independent of the specific fluid type. For a full scale tractor-trailer of length 16 m, travelling at highway speed of 29 m/s (65 mph), Re is $O(10^7)$, which is equivalent to a 4.5 m shark travelling at a speed of 9.8 m/s (22 mph) in seawater. Compressibility effects of air and water can be ignored while estimating Re, as the Mach number M, which is the ratio of local fluid velocity to the speed of sound in the fluid at 25° C., is less than 0.1 for both the tractor-trailer and the shark.

According to the principles of the present invention, a new class of trailer designs for aerodynamic drag reduction may provide potential energy savings. As discussed in greater detail below, towards the purpose of quantitatively evaluating various structures for drag reduction (a) systematic evaluation of the efficacy of various bio-inspired trailer plates towards reduction in aerodynamic drag was conducted, and (b) the mechanistic changes to the fluid-structure interaction arising due to modification of the trailer that lead to a reduction in drag are reported. To this end, a 1:42 scaled model of a tractor-trailer was studied experimentally inside a wind-tunnel facility. The trailer walls were designed to be reconfigurable to retrofit biologically inspired plates to modify the overall trailer geometry. The resulting drag coefficient and pressure distribution on the retrofitted trailer walls was measured and compared against complementing numerical analysis for both the scaled and full-scale trailers using k-ε model for turbulent flows. Importantly, by demonstrating kinematic and geometric similarity between a 1:42 scaled model and a full-scale model, in addition to solving numerical simulations, the drag reducing capabilities of the 1:42 scaled retrofits, when scaled up by a factor of 42, is demonstrated to be capable of reducing the drag coefficient of a full-scale tractor trailer. This is described in greater detail in the below Example.

Referring now to the figures and to FIGS. 1-1A in particular, a tractor-trailer 10 including a tractor 12 and a trailer 14 having an exemplary aerodynamic panel 16 on each side thereof is provided. The tractor-trailer 10 may be a class 8 vehicle such that the trailer 14 may have a length of approximately 53 feet, a height of approximately 9 feet, and/or a width of approximately 8 feet and 6 inches. Each illustrated aerodynamic panel 16 extends between first and second ends 20, 22, and visually and physically resembles one or more exterior features of a boxfish, such as a profile of a boxfish when viewed from above. More particularly, each aerodynamic panel 16 is non-planar and features a contoured profile of substantially constant radius from the first end 20 to the second end 22 when viewed from above. In other words, each panel 16 is contoured along its lengthwise direction from the first end 20 to the second end 22. As shown, the contoured profile is convex.

In one embodiment, the contoured profile of each panel 16 may be described as the shape of partial circumference of a circle C of radius of curvature R between approximately 83 m and approximately 84 m, casting an angle θ of approximately 8.2° as shown in FIG. 1. Thereby the total width of the trailer 14 may be increased by between approximately 0.18 m and approximately 0.22 m at or near the apexes of the panels 16. In one embodiment, the radius R of the contour may be approximately 83.7 m.

In the embodiment shown, the panels 16 are incorporated directly into the trailer design such that the trailer 14 is originally manufactured with the panels 16 in place. For example, each panel 16 may be configured as a wall, such as a sidewall, of the trailer 14 so as to at least partially define an interior cargo space of the trailer 14. Alternatively, the panels 16 may be "retrofitted" to the trailer 14, as described in greater detail below.

Figure 2:
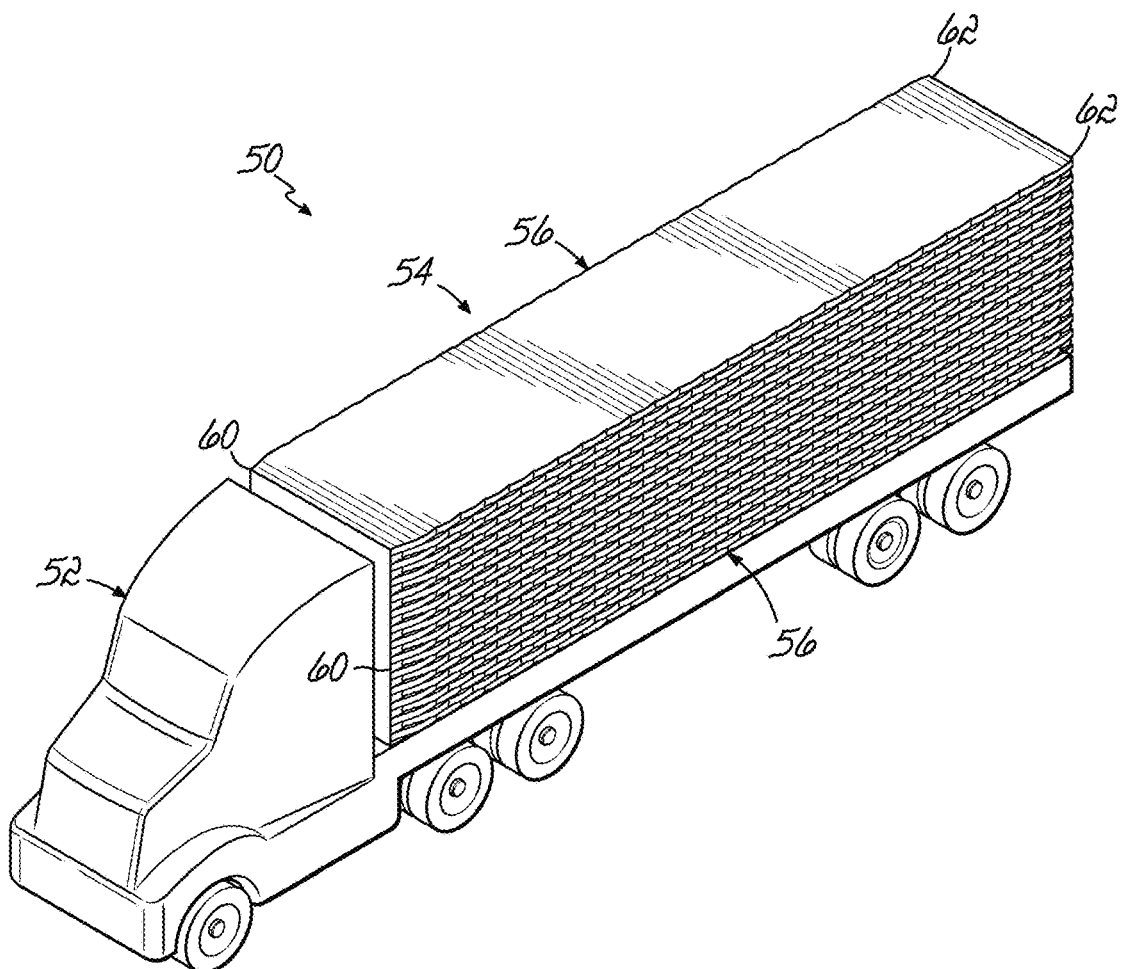
FIG. 2 is a schematic view of a tractor-trailer including another exemplary aerodynamic panel in accordance with an aspect of the invention.
Figures 2A, 2B:
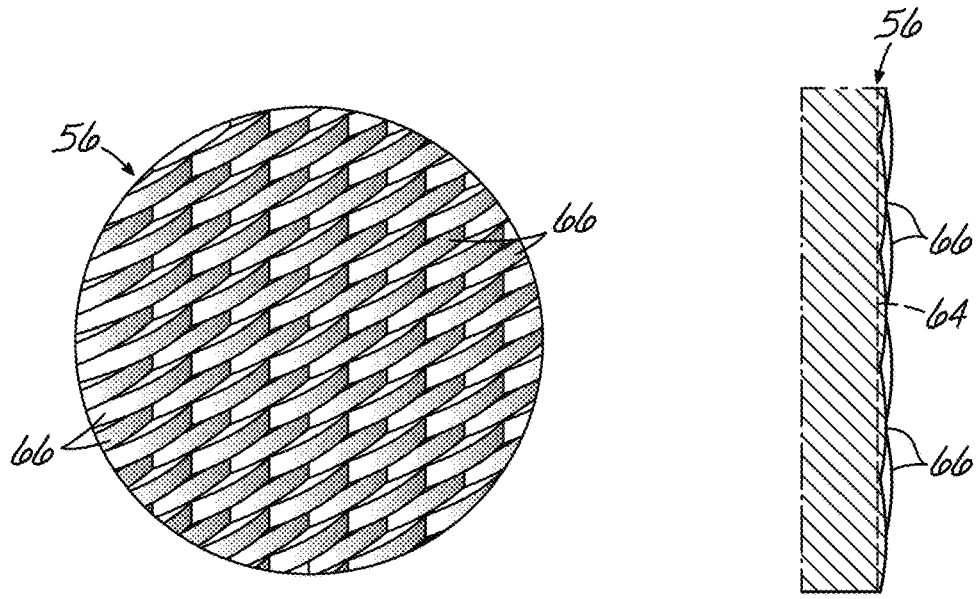
FIG. 2A is a magnified view of the panel of FIG. 2.
FIG. 2B is a cross sectional view of the panel of FIG. 2.

Referring now to FIGS. 2-2B, a tractor-trailer 50 including a tractor 52 and a trailer 54 having an alternative exemplary aerodynamic panel 56 on each side thereof is provided. The tractor-trailer 50 may be a class 8 vehicle such that the trailer 54 may have a length of approximately 53 feet, a height of approximately 9 feet, and/or a width of approximately 8 feet and 6 inches. Each illustrated aerodynamic panel 56 extends between first and second ends 60, 62, and visually and physically resembles one or more exterior features of a shark, such as a texture of sharkskin. More particularly, each aerodynamic panel 56 includes a substantially flat base 64 and an array of rib-like features or protrusions 66 generally similar to the dermal denticles of sharkskin or alligator skin protruding outwardly therefrom. As shown, each rib-like protrusion 66 is contoured along its lengthwise direction. In the embodiment shown, the rib-like protrusions 66 are aligned in the horizontal direction (or the direction parallel to the free-stream airflow direction during normal operation of the tractor-trailer 50) to define a plurality of rows, and are staggered in the vertical direction (or the direction perpendicular to the free-stream airflow direction during normal operation of the tractor-trailer 50). In one embodiment, approximately 25 rows of the rib-like protrusions 66 may be provided on each panel 56. In addition or alternatively, every other row may have approximately 27 rib-like protrusions 66 while each row therebetween may have approximately 26 rib-like protrusions 66, for example, to thereby achieve the vertically-staggered arrangement. As shown, the lengths of the rib-like protrusions 66 extending in the horizontal direction may be greater than the heights of the rib-like protrusions 66 extending in the vertical direction. For example, in one embodiment, the lengths of the rib-like protrusions 66 may be between approximately 0.4 m and approximately 0.42 m, while the heights of the rib-like protrusions 66 may be between approximately 0.092 m and approximately 0.105 m. The rib-like protrusions 66 may protrude outwardly from the base 64 by thickness of between approximately 0.07 m and approximately 0.084 m, thereby effectively increasing the width of the trailer 54 by the same amount on each side of the trailer 54. In one embodiment, adjacent rows of the rib-like protrusions 66 may protrude outwardly from the base 64 by different thicknesses. For example, the rib-like protrusions 66 of every other row may protrude outwardly from the base 64 by a first thickness while the rib-like protrusions 66 of each row therebetween may protrude outwardly from the base 64 by a second thickness different from the first thickness. In addition or alternatively, the rib-like protrusions 66 proximate the first and/or second ends 60, 62 may have lengths greater than the lengths of the remaining rib-like protrusions 66.

In the embodiment shown, the panels 56 are incorporated directly into the trailer design such that the trailer 54 is originally manufactured with the panels 56 in place. For example, each panel 56 may be configured as a wall, such as a sidewall, of the trailer 54 so as to at least partially define an interior cargo space of the trailer 54. Alternatively, the panels 56 may be "retrofitted" to the trailer 54, as described in greater detail below.

Figure 3B:
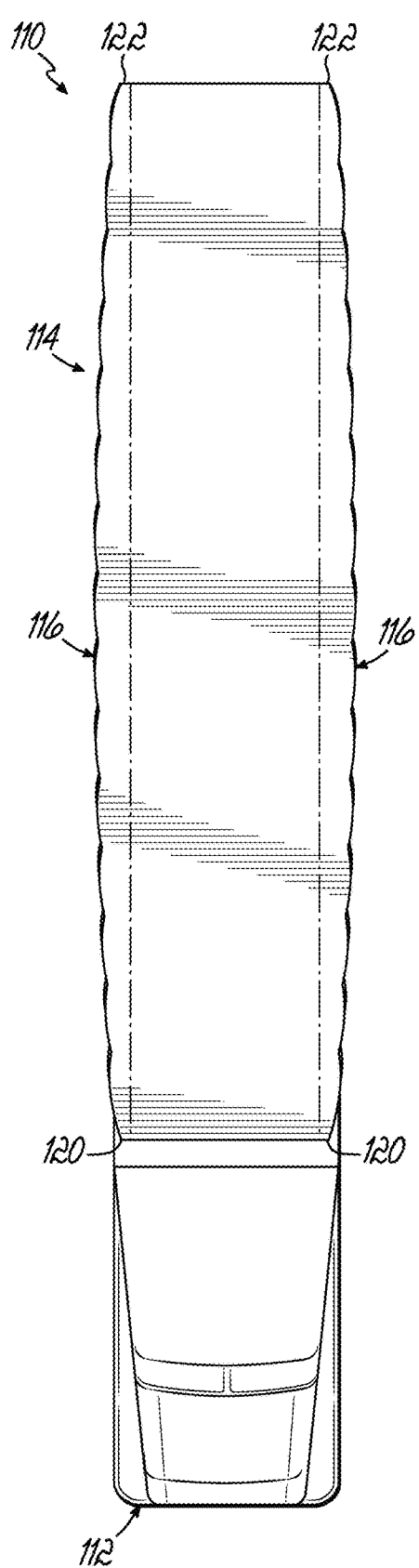
FIG. 3B is a top view of the tractor-trailer of FIG. 3.
Figure 3C:
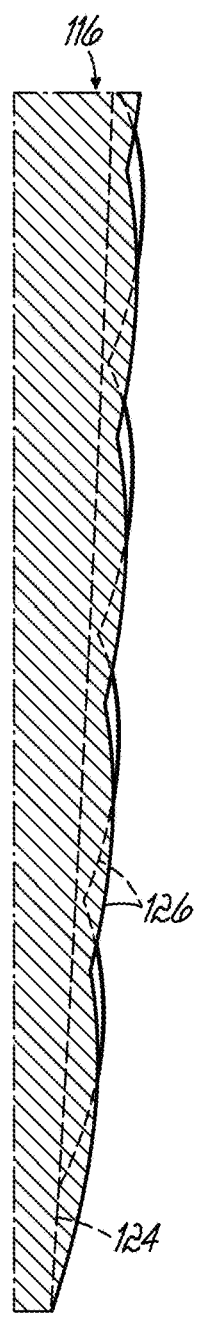
FIG. 3C is a cross sectional view of the panel of FIG. 3.
Figures 3, 3A:
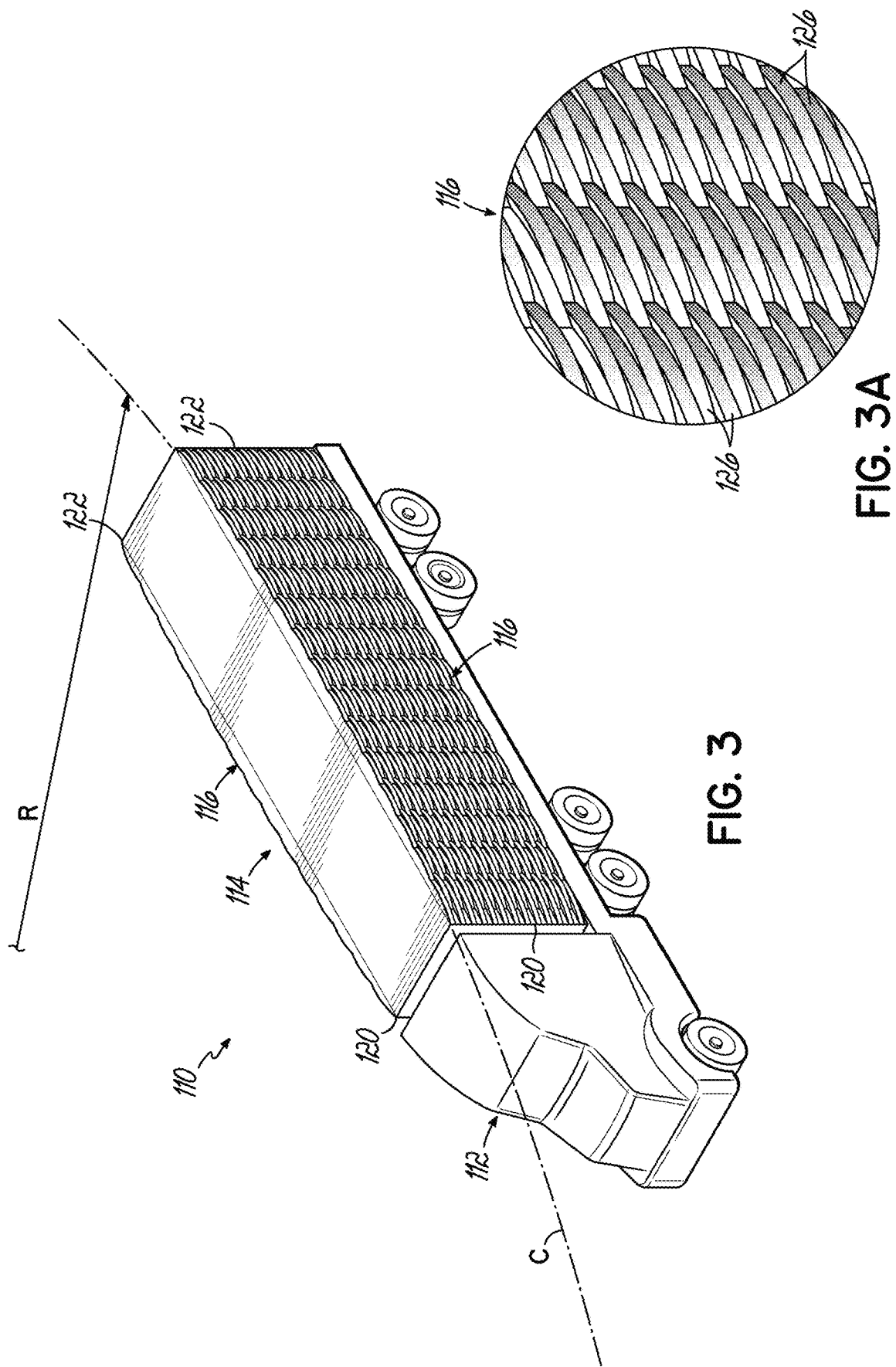
FIG. 3 is a schematic view of a tractor-trailer including another exemplary aerodynamic panel in accordance with an aspect of the invention.
FIG. 3A is a magnified view of the panel of FIG. 3.

Referring now to FIGS. 3-3C, a tractor-trailer 110 including a tractor 112 and a trailer 114 having another alternative exemplary aerodynamic panel 116 on each side thereof is provided. The tractor-trailer 110 may be a class 8 vehicle such that the trailer 114 may have a length of approximately 53 feet, a height of approximately 9 feet, and/or a width of approximately 8 feet and 6 inches. Each illustrated aerodynamic panel 116 extends between first and second ends 120, 122, and visually and physically resembles one or more exterior features of a boxfish, such as a profile of a boxfish when viewed from above, as well as one or more exterior features of a shark, such as a texture of sharkskin. Thus, each panel 116 may be considered a hierarchical boxfish and shark inspired panel 116 which generally combines or superposes certain aspects of the aforementioned boxfish and shark inspired panels 16, 56. More particularly, each panel 116 includes a base 124 contoured along its lengthwise direction, in a manner similar to the boxfish inspired panel 16 described above, and further includes an array of rib-like protrusions 126 generally similar to the dermal denticles of sharkskin or alligator skin protruding outwardly from the base 124, in a manner similar to the shark inspired panel 56 described above.

In this regard, the rib-like protrusions 126 are arranged in an array which conforms to a contoured profile of the base 124. For example, the contoured profile may resemble the shape of partial circumference of a circle C of radius of curvature R between approximately 83.000 m and approximately 84.000 m, similar to the contoured profile of the boxfish inspired panel 16. As shown, each rib-like protrusion 126 is contoured along its lengthwise direction.

In the embodiment shown, the rib-like protrusions 126 are aligned in the horizontal direction (or the direction parallel to the free-stream airflow direction during normal operation of the tractor-trailer 110) to define a plurality of rows, and are staggered in the vertical direction (or the direction perpendicular to the free-stream airflow direction during normal operation of the tractor-trailer 110). In one embodiment, approximately 25 rows of the rib-like protrusions 126 may be provided on each panel 116. In addition or alternatively, every other row may have approximately 27 rib-like protrusions 126 while each row therebetween may have approximately 26 rib-like protrusions 126, for example, to thereby achieve the vertically-staggered arrangement. As shown, the lengths of the rib-like protrusions 126 extending in the horizontal direction may be greater than the heights of the rib-like protrusions 126 extending in the vertical direction. For example, in one embodiment, the lengths of the rib-like protrusions 126 may be between approximately 0.4 m and approximately 0.42 m, while the heights of the rib-like protrusions 126 may be between approximately 0.07 m and approximately 0.084 m. The rib-like protrusions 126 may protrude outwardly from the base 124 by thickness of between approximately 0.092 m and approximately 0.105 m, such that the rib-like protrusions 126 in conjunction with the contoured profile of the base 124 may increase the width of the trailer 114 by between approximately 0.182 m and approximately 0.210 m on each side of the trailer 114. In one embodiment, adjacent rows of the rib-like protrusions 126 may protrude outwardly from the base 124 by different thicknesses. For example, the rib-like protrusions 126 of every other row may protrude outwardly from the base 124 by a first thickness while the rib-like protrusions 126 of each row therebetween may protrude outwardly from the base 124 by a second thickness different from the first thickness. In addition or alternatively, the rib-like protrusions 126 proximate the first and/or second ends 120, 122 may have lengths greater than the lengths of the remaining rib-like protrusions 126.

In the embodiment shown, the panels 116 are incorporated directly into the trailer design such that the trailer 114 is originally manufactured with the panels 116 in place. For example, each panel 116 may be configured as a wall, such as a sidewall, of the trailer 114 so as to at least partially define an interior cargo space of the trailer 114. Alternatively, the panels 116 may be "retrofitted" to the trailer 114, as described in greater detail below.

The panels 16, 56, 116 described herein may be constructed of any suitable material such as a plastic, a metal, or a fabric material. In addition or alternatively, the panels 16, 56, 116 may be constructed of a fabric material and may be inflatable or otherwise deployable to the configurations shown and described herein, such as when the tractor-trailer 10, 50, 110 reaches a threshold speed.

The panels 16, 56, 116 described herein may be attached to the trailer as add-on systems in order to "retrofit" the trailer 14, 54, 114 with the panels 16, 56, 116. For example, each panel 16, 56, 116 may be retrofitted or otherwise attached to a pre-existing wall, such as a sidewall, of the trailer 14, 54, 114. Such a pre-existing wall may be a conventional planar wall, for example. When utilized as add-on systems, the panels 16, 56, 116 may be coupled to the trailer 14, 54, 114 using any suitable attachment means including, for example, rivets, adhesives, nuts and bolts, and the like. In one embodiment, the panels 16, 56, 116 may be modular, such that the panels 16, 56, 116 may be exchangeable with each other. For example, the panels 16, 56, 116 and/or trailer may be equipped with a sliding rail mechanism such that the panels 16, 56, 116 may be slid into place on the trailer 14, 54, 114. The panels 16, 56, 116 may be subsequently slid off of the trailer 14, 54, 114 and replaced with different panels, for example.

While the above panels 16, 56, 116 have been described for use on the sides of a trailer 14, 54, 114, it will be appreciated that any of the above panels 16, 56, 116 may be used elsewhere on the trailer 14, 54, 114 such as, for example, on the top of the trailer 14, 54, 114. The panels 16, 56, 116 may be used on any other suitable vehicle or portion thereof such as, for example, a dry box van.

Figure 4A:
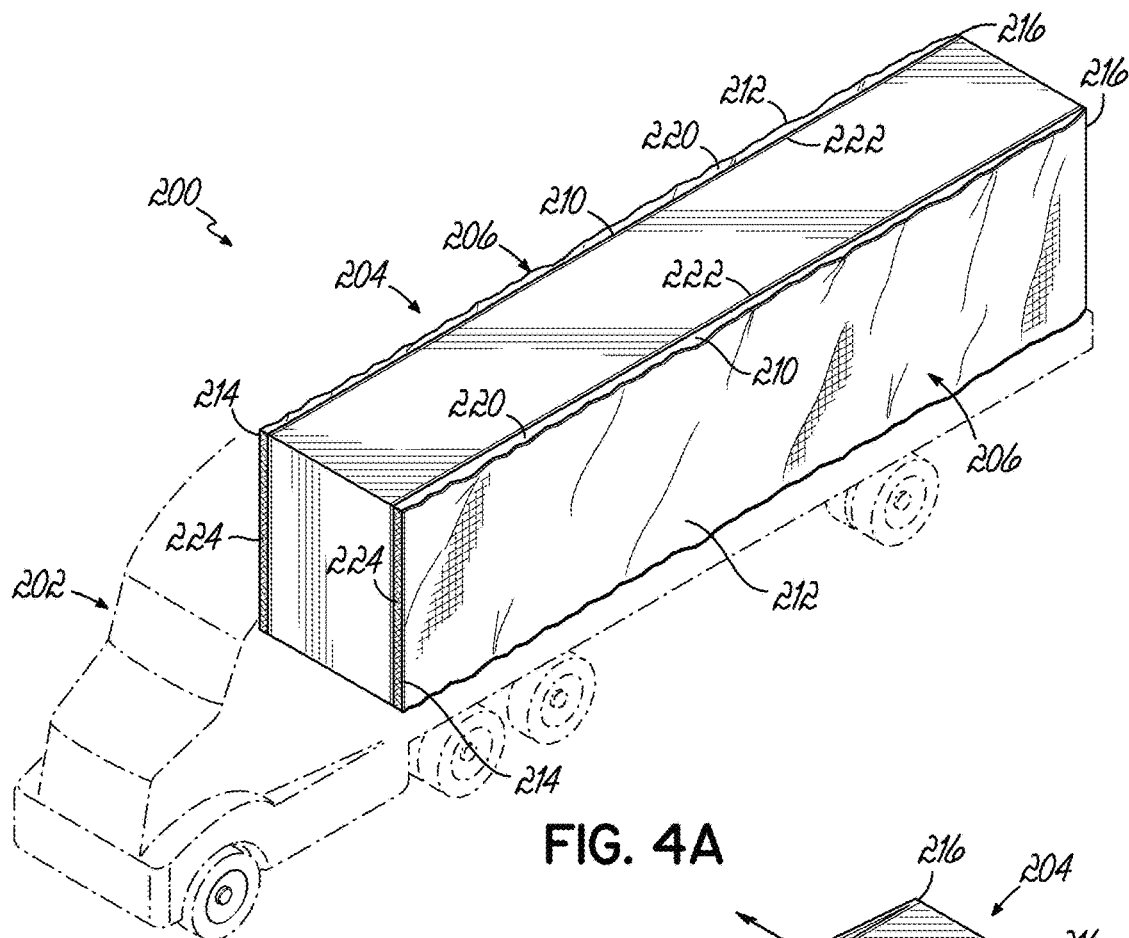
FIG. 4A is a schematic view of a tractor-trailer including another exemplary aerodynamic panel in accordance with an aspect of the invention, showing the panel in a flaccid or retracted state.
Figure 4B:
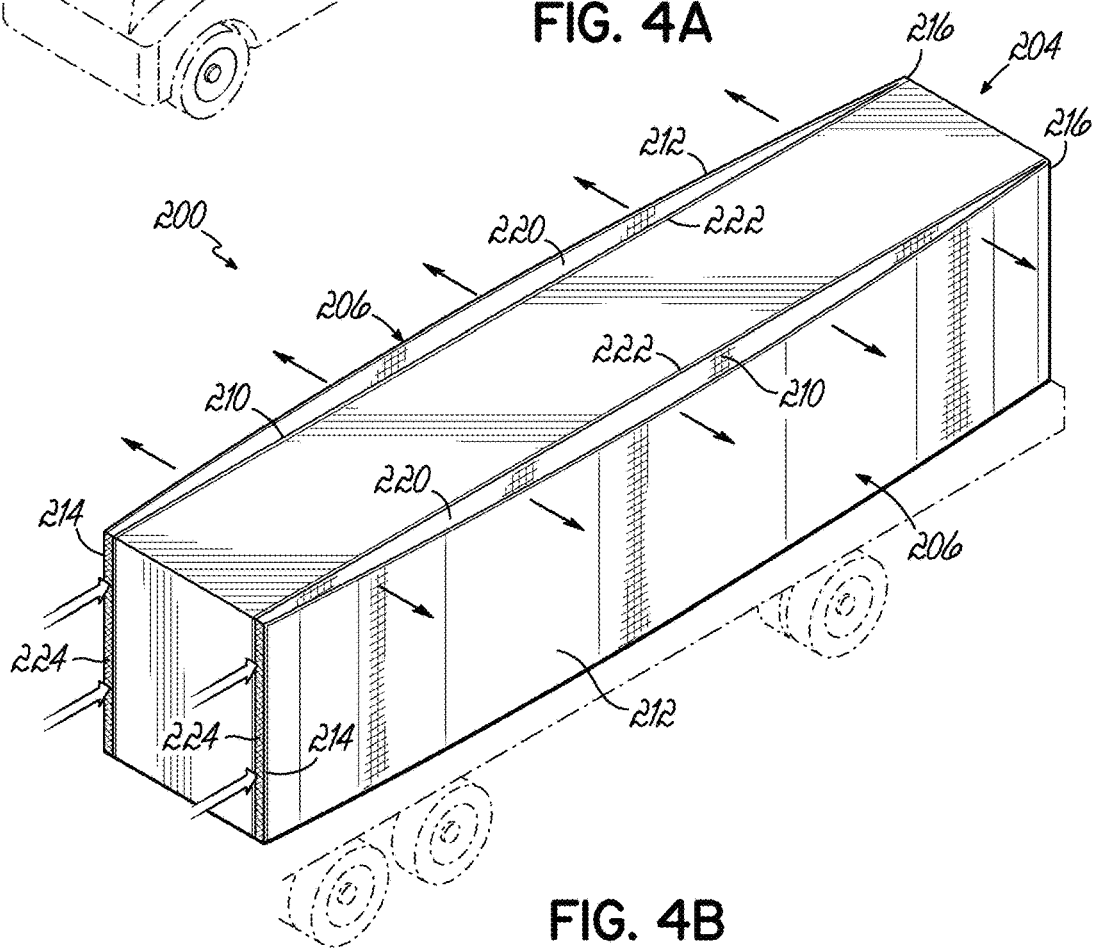
FIG. 4B is a schematic view similar to FIG. 4A, showing the panel in an inflated or deployed state.

Referring now to FIGS. 4A-4B, a tractor-trailer 200 including a tractor 202 and a trailer 204 having another alternative exemplary aerodynamic panel 206 on each side thereof is provided. The tractor-trailer 200 may be a class 8 vehicle such that the trailer 204 may have a length of approximately 53 feet, a height of approximately 9 feet, and/or a width of approximately 8 feet and 6 inches. Each panel 206 may be self-deployable from a flaccid condition (FIG. 4A) to an inflated condition (FIG. 4B) to alter the external topography of the tractor-trailer 200 during normal operation, without changing an internal cargo space of the trailer 204. The panel 206 may be constructed of a fabric-based material, such as a tarp or canvas, and may include a nylon-based composite, for example. In the embodiment shown, the panel 206 includes an inner portion 210 and an outer portion 212 stitched to each other along first and second seams 214, 216 to define a cavity 220. The inner portion 210 is configured to be fixed to a wall of the trailer 204, such as a sidewall 222, and the outer portion 212 is configured to extend away from the inner portion 210 at or near a midpoint thereof when the panel 206 is inflated. In this regard, one or more holes, mesh perforations, and/or porous pockets 224 may be provided at or near the first and/or second seams 214, 216 in order to allow air influx into the cavity 220 and/or air outflux out of the cavity 220 from free-stream air flow during transit of the tractor-trailer 200 in a direction opposite the free-stream air flow direction. More particularly, the pressure drop due to air flow at sufficient speeds, such as highway speeds, on the sides of the trailer 204 may facilitate an influx of air into the cavity 220. The air influx may pressurize the panel 206, causing the panel 206 to inflate thereby altering the external topography of the trailer 204, without changing the internal cargo space of the trailer 204. For example, in the inflated or deployed state, the outer portion 212 of the panel 206 may visually and physically resemble one or more exterior features of a boxfish, such as a profile of a boxfish when viewed from above. More particularly, the outer portion 212 of the panel 206 may be non-planar and feature a contoured profile of substantially constant radius when viewed from above in the inflated or deployed state. As shown, the length of the outer portion 212 of the panel 206 may be greater than the length of the inner portion 210 in order to assist in expansion of the outer portion 212 away from the inner portion 210 during inflation to achieve a desired configuration. In one embodiment, the inner portion 210 may be eliminated such that the cavity 220 may be defined by the outer portion 212 and respective sidewall 222.

For a trailer 204 having a length of 53 feet, the width of the cavity 220 (e.g., distance between the inner and outer portions 210, 212) may extend from approximately 0 inches at or near the first seam 214 to approximately 3 inches at or near the midpoint of the panel 206 and again reduced to approximately 0 inches at or near the second seam 216. To assist in achieving this configuration for such a trailer 204, the inner portion 210 of the panel 206 may have a length of approximately 53 feet and the outer portion 212 may have a length of approximately 53 feet and 0.6 inch. In one embodiment, the curvature of the outer portion 212 in the inflated or deployed state in such a case can be accurately characterized as the length of a partial perimeter of a circle of radius 370.735 ft, casting a sector angle of 8.2° 12' 11.27".

At lower speeds of the tractor-trailer 200, such as during docking, city driving, and parking, and when the tractor-trailer 200 is at rest, pressurization of the panel 206 may decrease such that the outer portion 212 may automatically retract, thereby causing the panel 206 to return to the flaccid or retracted state (FIG. 4A).

Referring now to FIGS. 5A-5B, a tractor-trailer 250 including a tractor 252 and a trailer 254 having another alternative exemplary aerodynamic panel 256 on top thereof is provided. The tractor-trailer 250 may be a class 8 vehicle such that the trailer 254 may have a length of approximately 53 feet, a height of approximately 9 feet, and/or a width of approximately 8 feet and 6 inches. The panel 256 may be self-deployable from a flaccid condition (FIG. 5A) to an inflated condition (FIG. 5B) to alter the external topography of the tractor-trailer 250 during normal operation, without changing an internal cargo space of the trailer 254. The panel 256 may be constructed of a fabric-based material, such as a tarp or canvas, and may include a nylon-based composite, for example. In the embodiment shown, the panel 256 includes an inner portion 260 and an outer portion 262 stitched to each other along first and second seams 264, 266 to define a cavity 270. The inner portion 260 is configured to be fixed to a wall of the trailer 254, such as a top wall 272, and the outer portion 262 is configured to extend away from the inner portion 260 at or near a point between a midpoint thereof and the first seam 264 when the panel 256 is inflated. In this regard, one or more holes, mesh perforations, and/or porous pockets 274 may be provided at or near the first and/or second seams 264, 266 in order to allow air influx into the cavity 270 from free-stream air flow during transit of the tractor-trailer 250 in a direction opposite the free-stream air flow direction. More particularly, the pressure drop due to air flow at sufficient speeds, such as highway speeds, on the top of the trailer 254 may facilitate an influx of air into the cavity 270. The air influx may pressurize the panel 256, causing the panel 256 to inflate thereby altering the external topography of the trailer 254, without changing the internal cargo space of the trailer 254. For example, in the inflated or deployed state, the outer portion 262 of the panel 256 may visually and physically resemble one or more exterior features of a boxfish, such as a profile of a boxfish when viewed from above. More particularly, the outer portion 262 of the panel 256 may be non-planar and feature a contoured profile of variable radius when viewed from a side in the inflated or deployed state. As shown, the length of the outer portion 262 of the panel 256 may be greater than the length of the inner portion 260 in order to assist in expansion of the outer portion 262 away from the inner portion 260 during inflation to achieve a desired configuration. In one embodiment, the inner portion 260 may be eliminated such that the cavity 270 may be defined by the outer portion 262 and the top wall 272.

For a trailer 254 having a length of 53 feet and a height of 9 feet, the height of the cavity 270 (e.g., distance between the inner and outer portions 260, 262) may extend from $Y_1$=approximately 0 inches at or near the first seam 264 to $Y_2$=approximately 4 inches at X=approximately 20 feet along the length of the trailer 254 from the first seam 264 and again reduced to $Y_3$=approximately 0 inches at or near the second seam 266.

At lower speeds of the tractor-trailer 250, such as during docking, city driving, and parking, and when the tractor-trailer 250 is at rest, pressurization of the panel 256 may decrease such that the outer portion 262 may automatically retract, thereby causing the panel 256 to return to the flaccid or retracted state (FIG. 5A).

Figure 6:
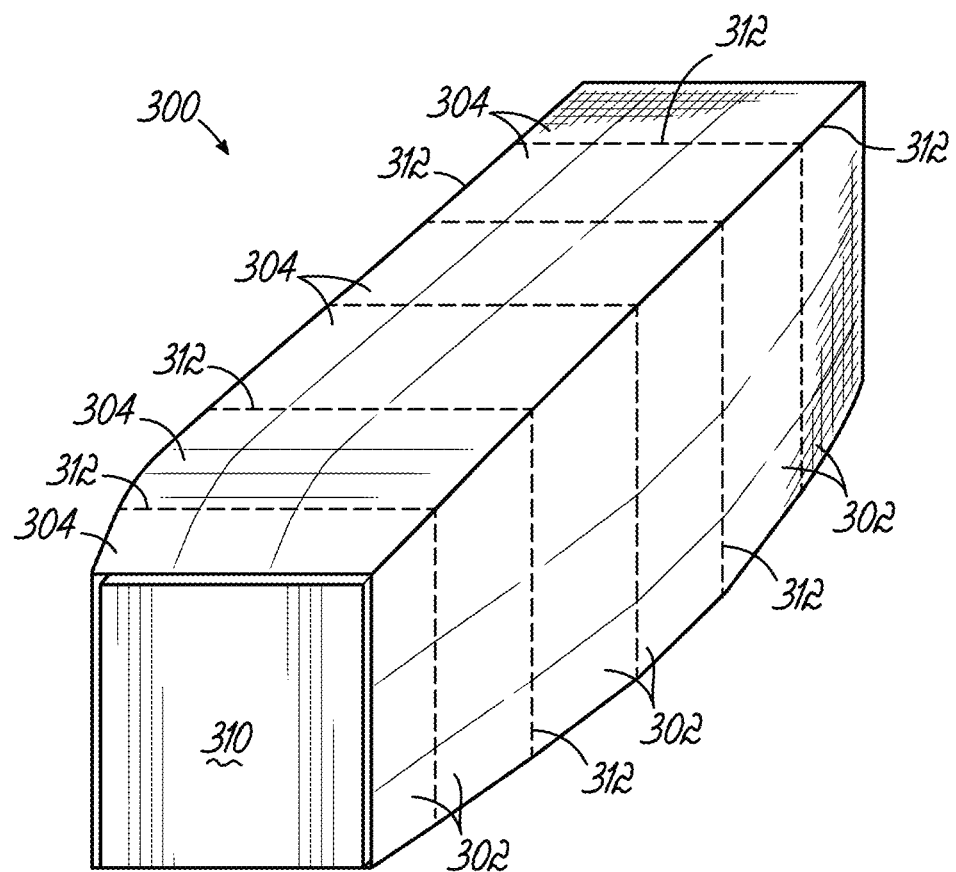
FIG. 6 is a schematic view of a multi-panel unit in accordance with an aspect of the invention.

Referring now to FIG. 6, a multi-panel unit 300 including a plurality of aerodynamic side and top panels 302, 304 may be self-deployable from a flaccid condition (not shown) to the illustrated inflated condition to alter the external topography of a trailer 310 during normal operation, without changing an internal cargo space of the trailer 310. The side panels 302 may be generally similar to the panels 206 described above, and may be shortened in length such that each side panel 302 corresponds to a portion of the length of the trailer 310. Likewise, the top panels 304 may be generally similar to the panels 256 described above, and may be shortened in length such that each top panel 304 corresponds to a portion of the length of the trailer 310. Each of the panels 302, 304 may be fabricated separately and assembled together along respective seams 312 to form the multi-panel unit 300. For example, the panels 302, 304 may be attached to each other over the exterior of the trailer 310. In one embodiment for a trailer 310 having a length of approximately 53 feet, a height of approximately 9 feet, and a width of approximately 8 feet six inches, when the unit 300 is inflated, the widths of the side panels 302 at the forwardmost (first) seam 312 may be approximately 0.5 inch, and the height of the top panels 304 at the first seam 312 may be approximately 2 inches; the widths of the side panels 302 at the subsequent (second) seam 312 may be approximately 1.5 inches, and the height of the top panels 304 at the second seam 312 may be approximately 4 inches; the widths of the side panels 302 at the next (third) seam 312 may be approximately 2.75 inches, and the height of the top panels 304 at the third seam 312 may be approximately 3 inches; the widths of the side panels 302 at the following (fourth) seam 312 may be approximately 1.5 inches, and the height of the top panels 304 at the fourth seam 312 may be approximately 1.5 inches; the widths of the side panels 302 at the rearwardmost (fifth) seam 312 may be approximately 0.5 inch, and the height of the top panels 304 at the rearwardmost seam 312 may be approximately 0.5 inch. Thus, when the unit 300 is inflated, the trailer 310 may have a maximum width increase of approximately 3 inches on each side and a maximum height increase of approximately 4 inches.

Figure 7A:
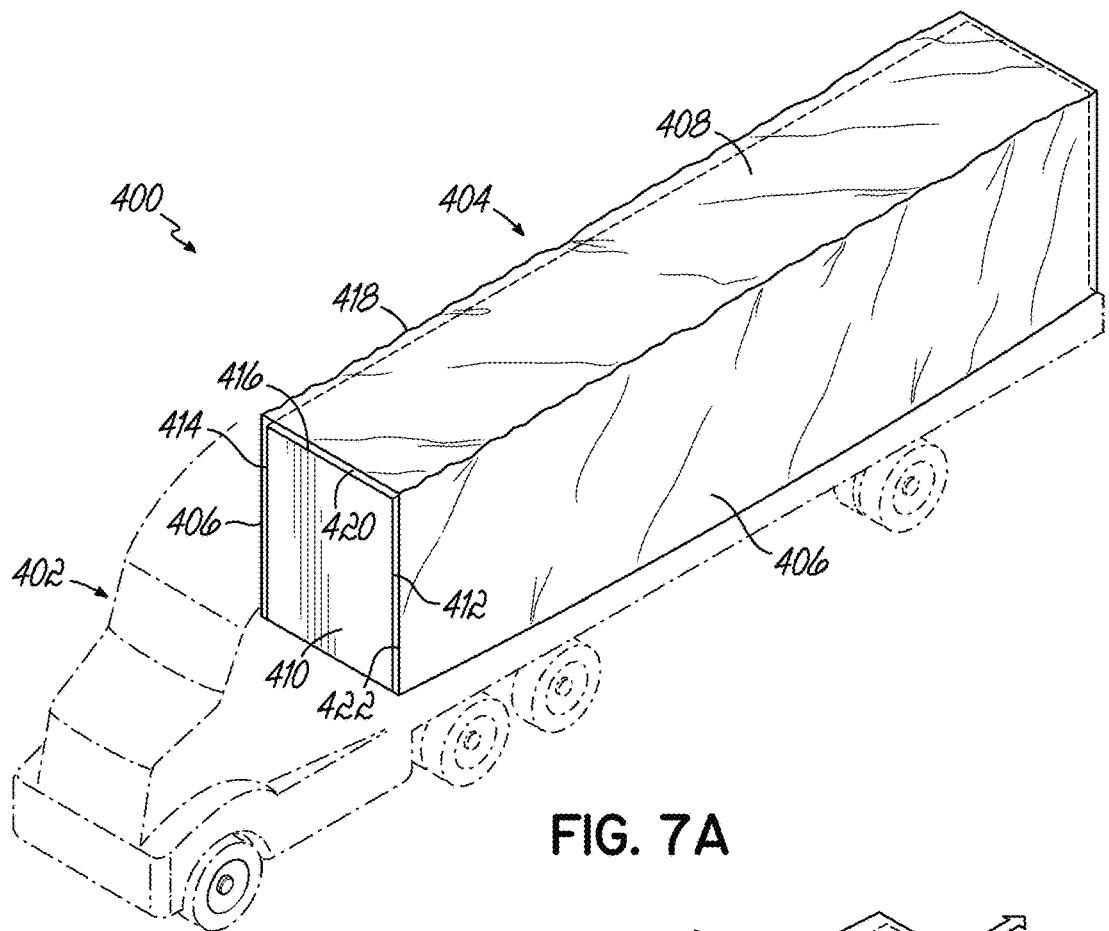
FIG. 7A is a schematic view of a tractor-trailer including another exemplary aerodynamic panel in accordance with an aspect of the invention, showing the panel in a flaccid or retracted state.
Figure 7B:
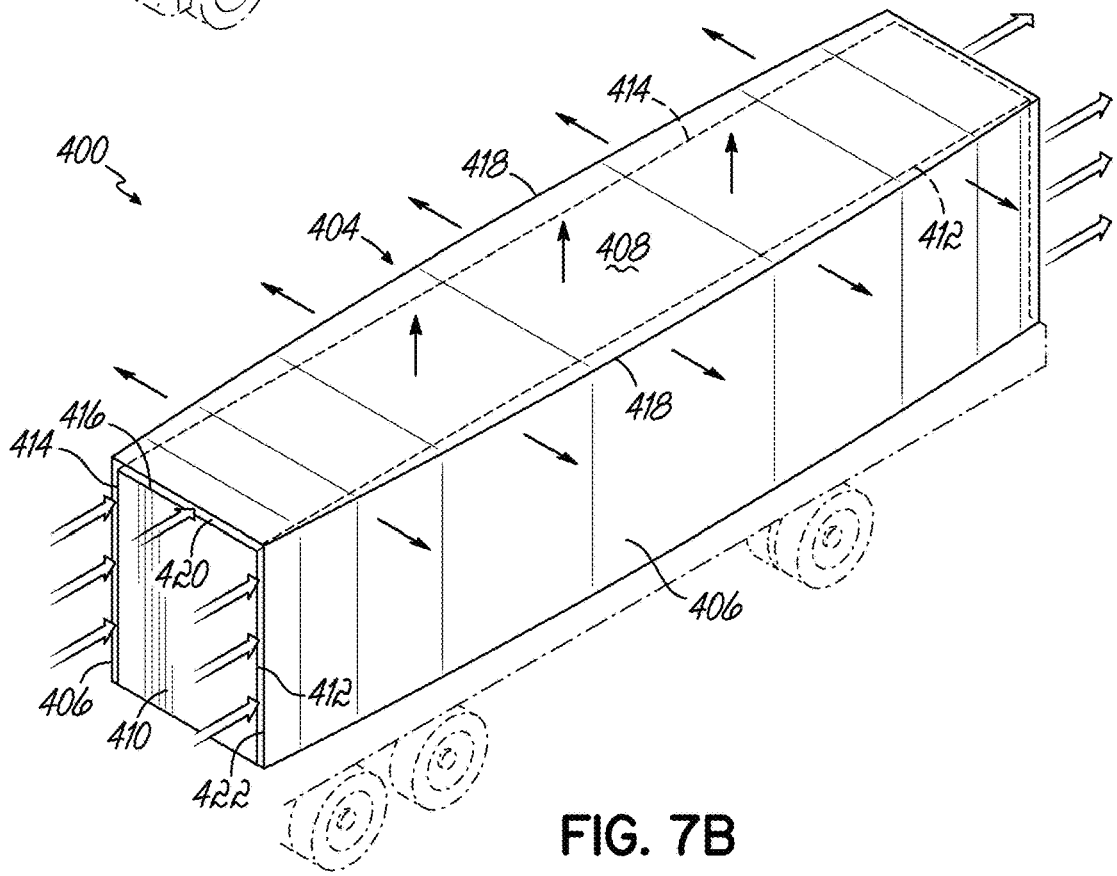
FIG. 7B is a schematic view similar to FIG. 7A, showing the panel in an inflated or deployed state.

Referring now to FIGS. 7A-7B, a tractor-trailer 400 including a tractor 402 and a trailer 404 having aerodynamic side and top panels 406, 408 is provided. The tractor-trailer 400 may be a class 8 vehicle such that the trailer 404 may have a length of approximately 53 feet, a height of approximately 9 feet, and/or a width of approximately 8 feet and 6 inches. The trailer 404 includes a front wall 410, at least one rear door (not shown), first and second side walls 412, 414, a top wall 416, and a bottom platform together at least partially defining an interior cargo space (not shown).

As shown, the trailer 404 may be retrofitted with side aerodynamic panels 406 and a top aerodynamic panel 408, each of which may be self-deployable from a flaccid condition (FIG. 7A) to an inflated condition (FIG. 7B) to alter the external topography of the tractor-trailer 400 during normal operation, without changing an internal cargo space of the trailer 404. The panels 406, 408 may each be constructed of a fabric-based material, such as a tarp or canvas, and may include a nylon-based composite, for example. In the embodiment shown, the side panels 406 are each stitched to the top panel 408 along respective seams 418, and the panels 406, 408 are each configured to be fixed to a respective wall 412, 414, 416 of the trailer 404 and spaced apart therefrom at a predetermined distance such as approximately 3 inches at or near the front wall 410 and/or rear door to define at least one cavity 420, and to extend away from the respective wall 412, 414, 416 during inflation. In this regard, the spacing of each panel 406, 408 away from the respective wall 412, 414, 416 at or near the front wall 410 may define at least one inlet 422 for allowing air influx into the at least one cavity 420 from free-stream air flow during transit of the tractor-trailer 400 in a direction opposite the free-stream air flow direction. More particularly, the pressure drop due to air flow at sufficient speeds, such as highway speeds, on the trailer 404 may facilitate an influx of air into the at least one cavity 420. The air influx may pressurize the panels 406, 408, causing the panels 406, 408 to inflate thereby altering the external topography of the trailer 404, without changing the internal cargo space of the trailer 404. For example, in the inflated or deployed state, the panels 406, 408 may visually and physically resemble one or more exterior features of a boxfish, such as a profile of a boxfish when viewed from above. More particularly, the panels 406, 408 may be non-planar and feature a contoured profile in the inflated or deployed state. As shown, the lengths of the panels 406, 408 may be greater than the lengths of the respective walls 412, 414, 416 in order to assist in expansion of the panels 406, 408 away from the respective walls 412, 414, 416 during inflation to achieve a desired configuration. Thus, the walls 412, 414, 416 of the trailer 404 themselves may effectively function to replace the inner portions of the panels 16, 56, 116 described above.

For a trailer 404 having a length of 53 feet, the widths of the at least one cavity 420 on the sides of the trailer 404 (e.g., distances between the side panels 406 and respective sidewalls 412, 414) may extend from approximately 3 inches at or near the front wall 410 to approximately 6 inches at or near the midpoints of the side panels 406 and again reduced to approximately 3 inches at or near the rear door(s). Thus, the width of such a trailer 404 equipped with the side panels 406 may be effectively increased by approximately 12 inches when the panels 406 are inflated or deployed, as compared to the normal width of the trailer 404 defined by the distance between the first and second sidewalls 412, 414.

Figure 8:
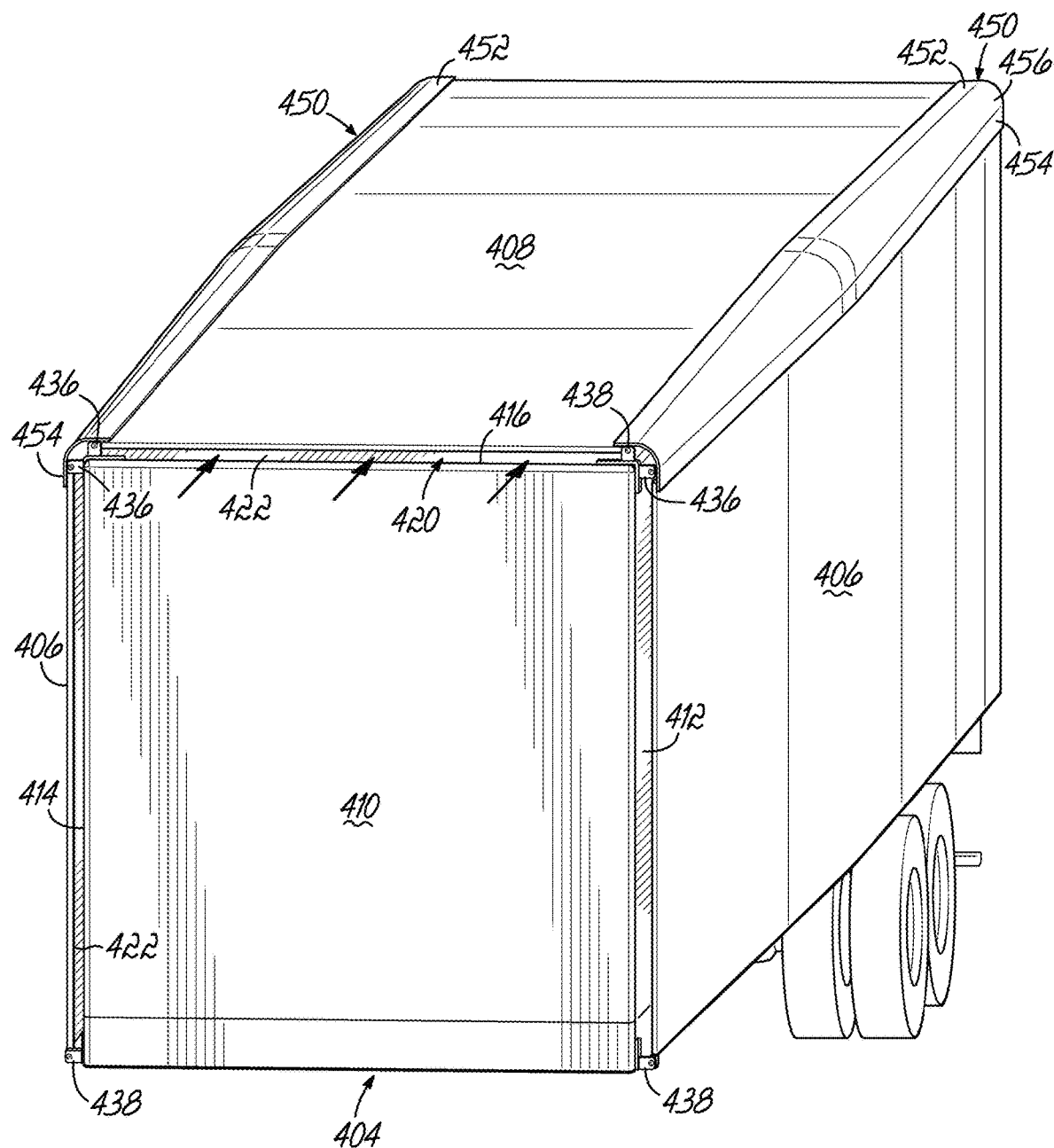
FIG. 8 is a schematic view of the trailer of FIGS. 7A and 7B, showing a coupling of the panels to the trailer.
Figure 8A:
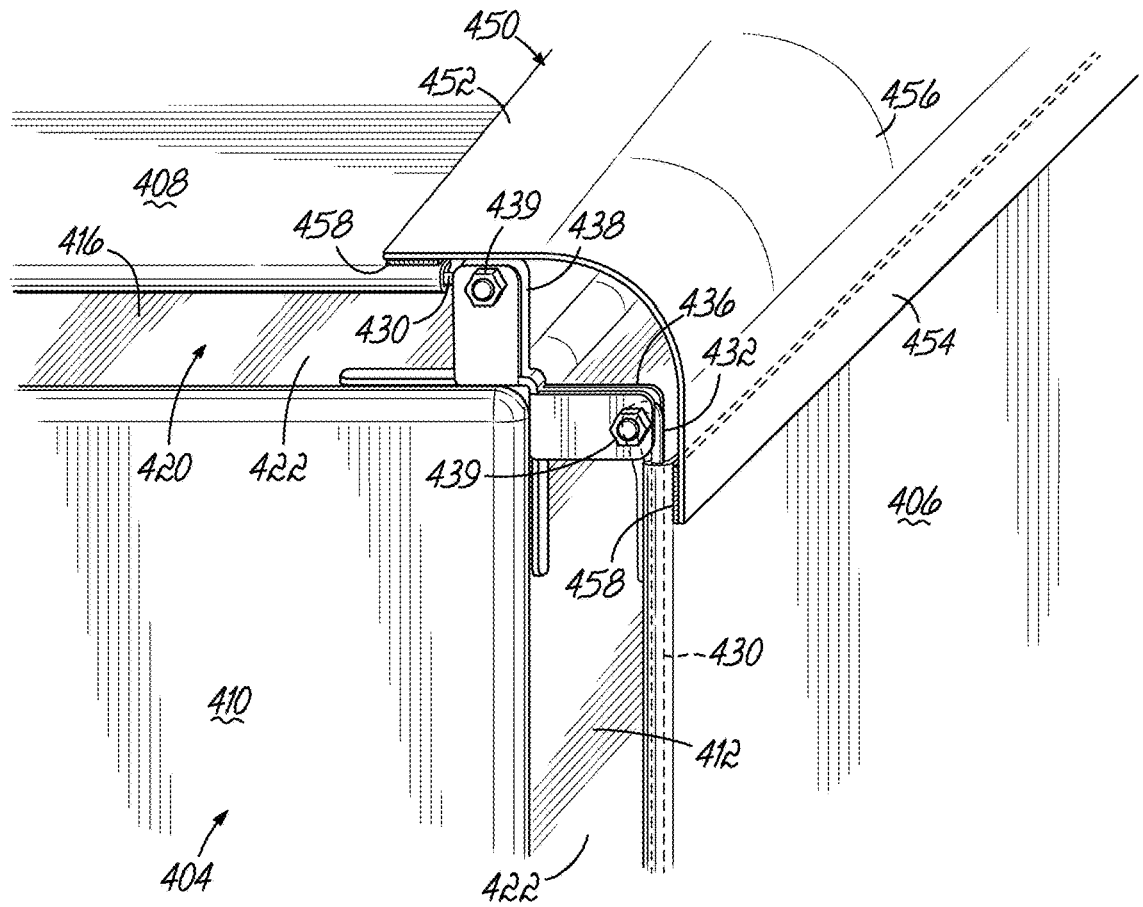
FIGS. 8A and 8B are detail schematic views of upper and lower portions of the trailer of FIG. 8, respectively.
Figure 8B:
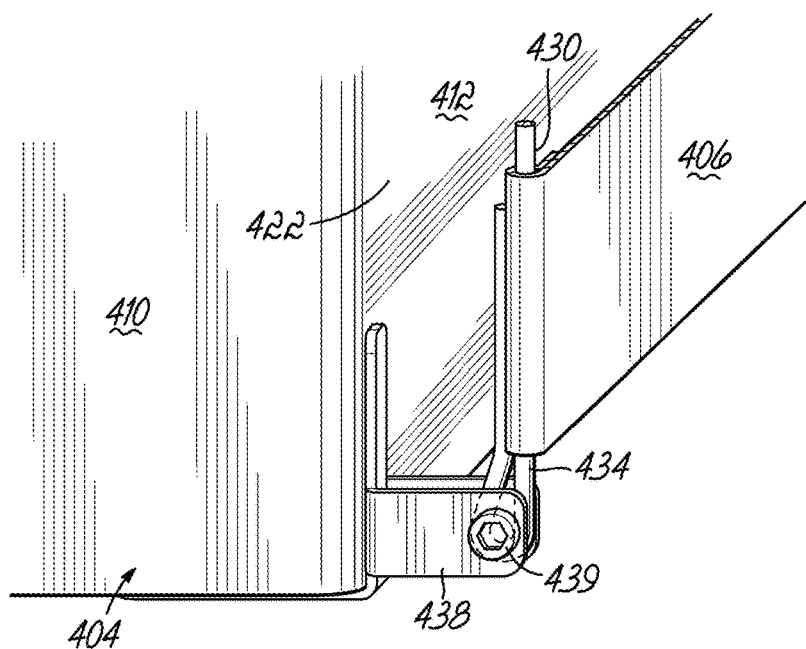
Figure 9A:
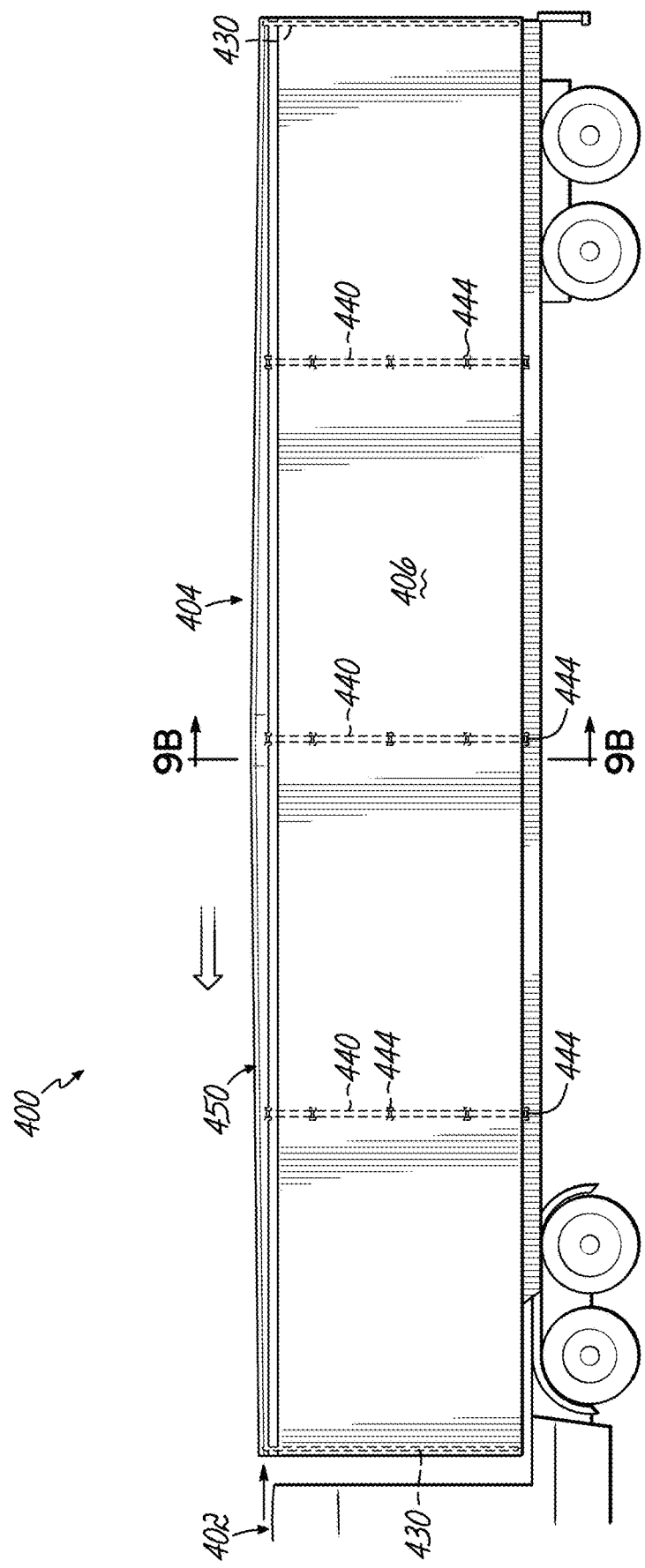
FIG. 9A is a side view of the trailer of FIGS. 7A and 7B, showing the coupling of the panels to the trailer.
Figure 9B:
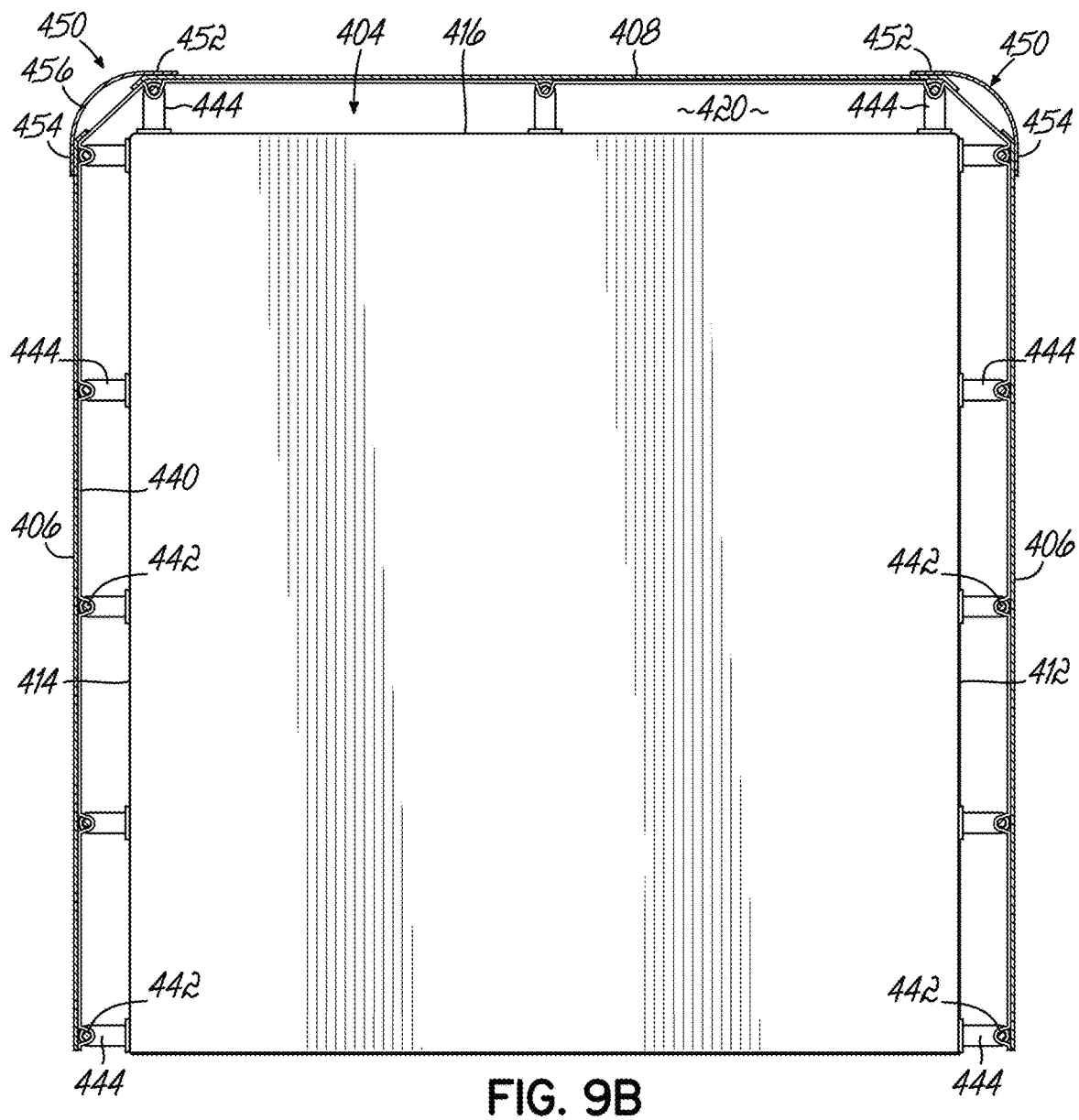
FIG. 9B is a cross sectional view of the trailer taken along section line 9B-9B in FIG. 9A.
Figure 9C:
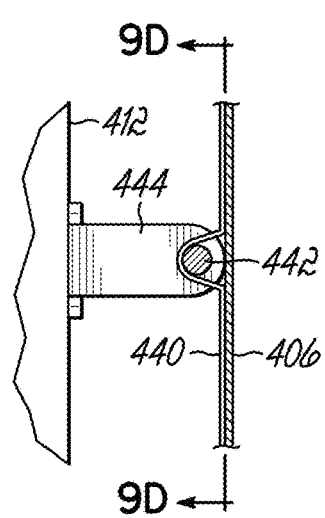
FIG. 9C is a detail schematic view of a portion of the trailer of FIG. 9A.
Figure 9D:
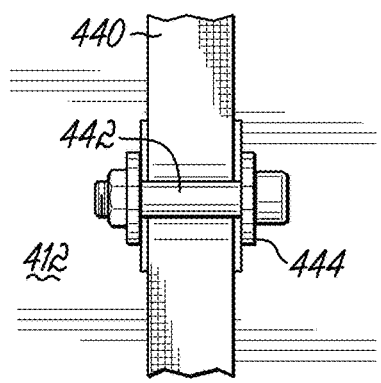
FIG. 9D is a cross sectional view taken along section line 9D-9D in FIG. 9C.

Referring now to FIGS. 8-8B, with continuing reference to FIGS. 7A and 7B, in one embodiment, the panels 406, 408 are tethered to the respective walls 412, 414, 416 via corresponding cables 430 secured along the front and/or rear ends of the panels 406, 408, such as via stitching or adhesive. The illustrated cables 430 each have first and second looped ends 432, 434 coupled to first and second brackets or standoffs 436, 438 protruding outwardly from the respective walls 412, 414, 416 at or near the front wall 410 and/or rear doors via fasteners 439, for example. The standoffs 436, 438 may have lengths approximately equal to the desired spacings between the respective panels 406, 408 and walls 412, 414, 416 to provide the at least one inlet 422 of a desired size. For example, each standoff 436, 438 may have a length of approximately 3 inches to provide inlets 422 of approximately 3 inches in width for air influx into the at least one cavity 420. The cables 430 may be taught such that the desired size of the inlet 422 may be maintained during normal operation.

Referring now to FIGS. 9A-9D, with continuing reference to FIGS. 7A-8B, the illustrated panels 406, 408 are also secured to the respective walls 412, 414, 416 via a plurality of straps 440 extending around the respective walls 412, 414, 416 the trailer 404 along the length thereof and captured by fasteners 442 and accompanying brackets 444 attached to the walls 412, 414, 416, such as via adhesive. The panels 406, 408 may be removably attached to the straps 440 by any suitable fasteners, such as magnetic couplings described in greater detail below. In the embodiment shown, the strap(s) 440 proximate to the midpoints of the side panels 406 may have more slack as compared to the strap(s) 440 and/or cables 430 proximate to the front and rear ends of the side panels 406 to assist in the inflation of the side panels 406 to achieve a desired configuration, such as the contoured profiles in the inflated or deployed states similar to those illustrated in FIG. 7B. In this regard, one or more ratchets (not shown) may be used to adjust the tension in each strap 440 as may be desired.

As best shown in FIGS. 8, 8A, 9A, and 9B, the illustrated top panel 408 may be indirectly coupled to each of the side panels 406 via a corresponding bridge 450, in place of the direct coupling via seams 418 shown in FIGS. 7A-7B. Each of the bridges 450 includes first and second arm portions 452, 454 and an elbow portion 456 therebetween, such that each bridge 450 has a generally C-shaped cross section. The first arm portions 452 are coupled to the top panel 408 and the second arm portions 454 are coupled to the respective side panel 406 via any suitable fasteners, such as rivets, snap buttons, bolts/screws, and/or the illustrated hook and loop fasteners 458. In the embodiment shown, the bridges 450 are constructed of a substantially rigid material such that the shape of the bridges 450 may be maintained during normal operation of the tractor-trailer 400. In this regard, each of the bridges 450 may be contoured along the lengthwise direction to assist in the inflation of the side panels 406 to achieve a desired configuration, such as the contoured profiles in the inflated or deployed states similar to those illustrated in FIG. 7B. For example, for a trailer 404 having a length of 53 feet, the curvature of each bridge 450 may be accurately characterized as the length of a partial perimeter of a circle of radius 370.735 ft, casting a sector angle of 8.2° 12' 11.27". In another embodiment, the bridges 450 may be constructed of a fabric-based material. In addition or alternatively, one or both bridges 450 may be integrally formed together with one of the panels 406, 408 as a unitary piece. For example, one of the bridges 450 may be configured as a flap of one of the panels 406, 408.

Figure 10:
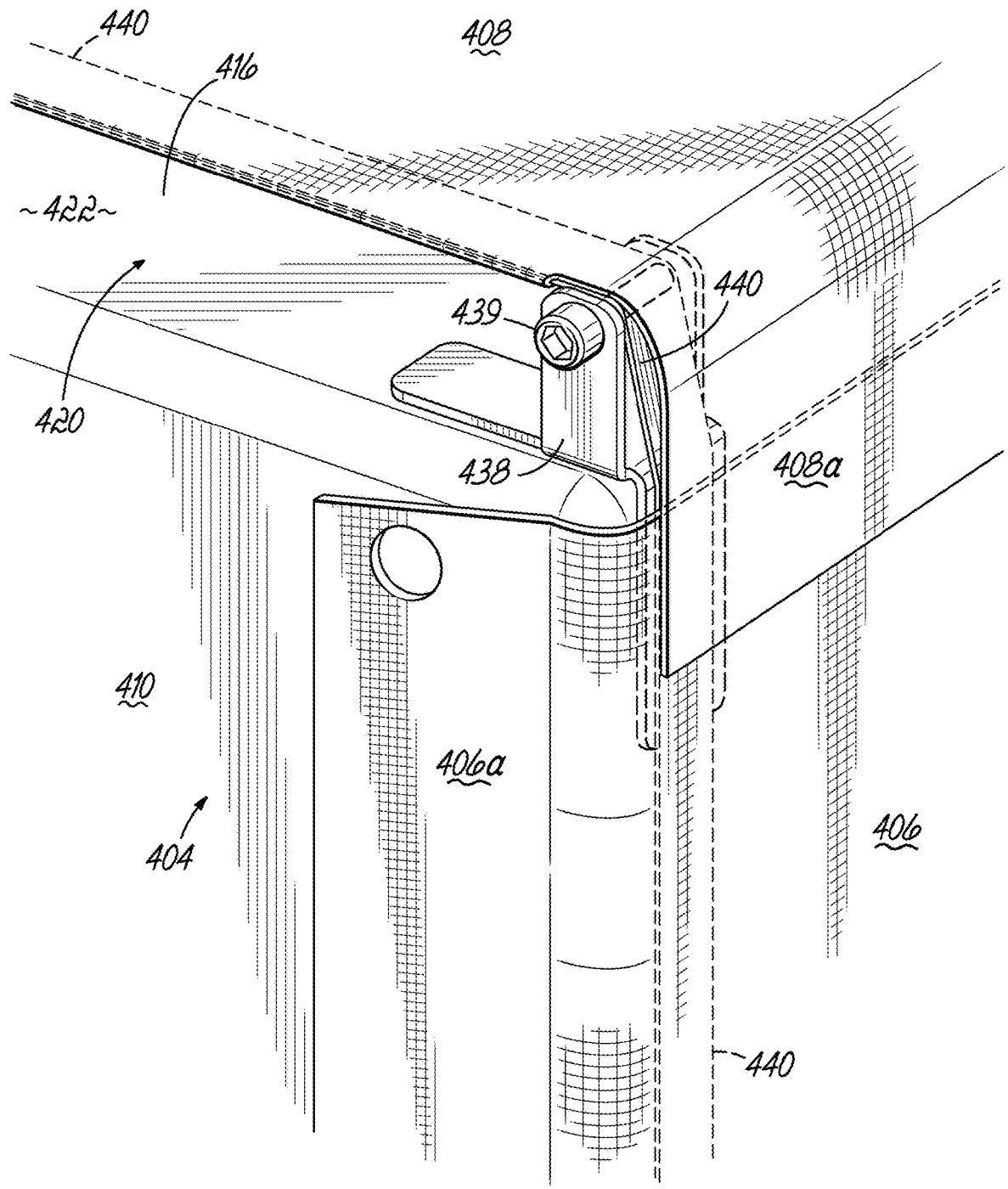
FIG. 10 is a partial schematic view of the trailer of FIGS. 7A and 7B, showing an alternative coupling of the panels to the trailer.

Referring now to FIG. 10, with continuing reference to FIGS. 7A-9D, in an alternative embodiment, the top panel 408 is spaced apart from the top wall 416 at a predetermined distance such as approximately 3 inches at or near the front wall 410 to define the at least one cavity 420 in communication with relatively narrow cavities (not shown) between the side panels 406 and respective sidewalls 412, 414. In this regard, the spacing of the top panel 408 away from the top wall 416 at or near the front wall 410 may define the inlet 422 for allowing air influx into the cavity 420 and the narrower cavities from free-stream air flow during transit of the tractor-trailer 400 in a direction opposite the free-stream air flow direction. More particularly, the pressure drop due to air flow at sufficient speeds, such as highway speeds, on the trailer 404 may facilitate an influx of air into the cavity 420 and narrower cavities. The air influx may pressurize the panels 406, 408, causing the panels 406, 408 to inflate thereby altering the external topography of the trailer 404, without changing the internal cargo space of the trailer 404. For example, in the inflated or deployed state, the panels 406, 408 may visually and physically resemble one or more exterior features of a boxfish, such as a profile of a boxfish when viewed from above. More particularly, the panels 406, 408 may be non-planar and feature a contoured profile in the inflated or deployed state. The lengths of the panels 406, 408 may be greater than the lengths of the respective walls 412, 414, 416 in order to assist in expansion of the panels 406, 408 away from the respective walls 412, 414, 416 during inflation to achieve a desired configuration.

In the embodiment shown, the panels 406, 408 are secured to the respective walls 412, 414, 416 via a front strap 440 extending around the respective walls 412, 414, 416 of the trailer 404 at or near the front wall 410. The side panels 406 may be removably attached to the front strap 440 by any suitable fasteners, such as magnetic couplings described below, and the top panel 408 may be attached to the front strap 440 by stitching or adhesive, for example. A pair of brackets or standoffs 438 protrude outwardly from the top wall 416 at or near the front wall 410 and/or respective sidewalls 412, 414 and the front strap 440 extends thereover to space the top panel 408 away from the top wall 416. The standoffs 438 may have lengths approximately equal to the desired spacing between the top panel 408 and top wall 416 to provide the inlet 422 of a desired size. For example, each standoff 438 may have a length of approximately 3 inches to provide an inlet 422 of approximately 3 inches in width for air influx. As shown, the front strap 440 may be ratcheted tight against the standoffs 438 and the sidewalls 412, 414.

In the embodiment shown, the top panel 408 includes side flaps 408a coupled to the side panels 406 to assist in directing portions of the air influx from the cavity 420 into the narrower cavities behind the side panels 406. The side flaps 408a may be coupled to the respective side panels 406 via any suitable fasteners, such as rivets, snap buttons, bolts/screws, and/or hook and loop fasteners (not shown). In addition or alternatively, the top panel 408 may be coupled to each of the side panels 406 via a corresponding bridge similar to that described above.

In the embodiment shown, the side panels 406 each include a front flap 406a secured to the front wall 410 of the trailer 404 to inhibit air influx directly into the side cavities (e.g., without first passing through the top cavity 420). The front flaps 406a may be secured to the front wall 410 via any suitable fasteners, such as straps or adhesive tape (not shown).

Figure 11:
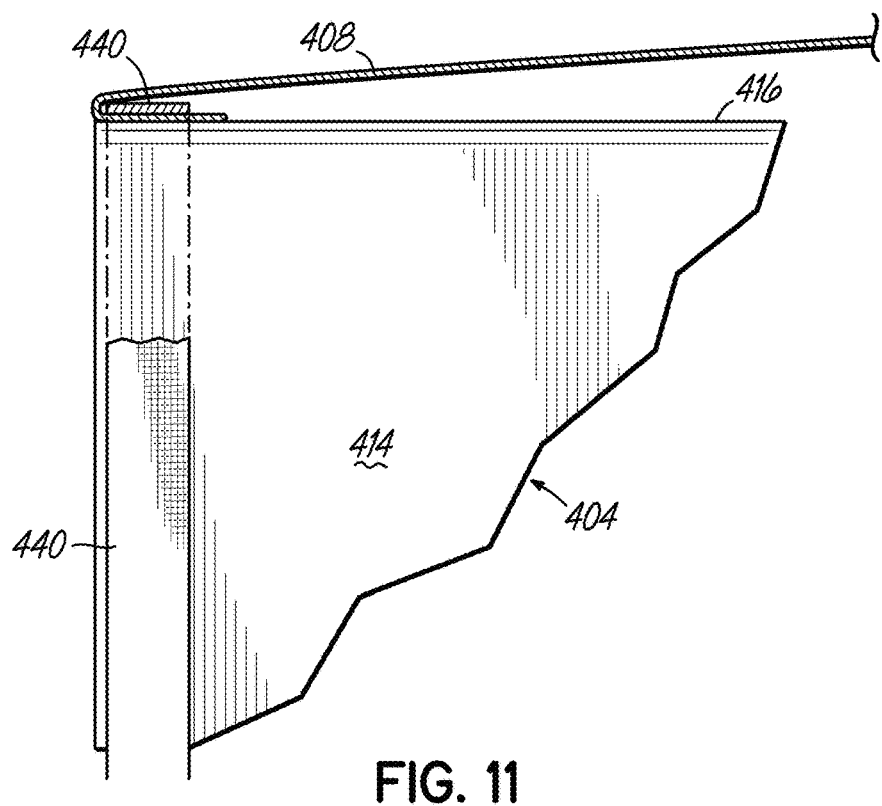
FIG. 11 is a schematic view of the trailer of FIG. 10.

Referring now to FIG. 11, with continuing reference to FIG. 10, the illustrated panels 406, 408 are also secured to the respective walls 412, 414, 416 via a rear strap 440 extending around the respective walls 412, 414, 416 of the trailer 404 at or near the rear door. The panels 406, 408 may be removably attached to the rear strap 440 by any suitable fasteners, such as magnetic couplings described below. As shown, the rear strap 440 may be ratcheted tight against the top wall 416 and sidewalls 412, 414 to inhibit air outflux from the cavities 420.

Figure 12:
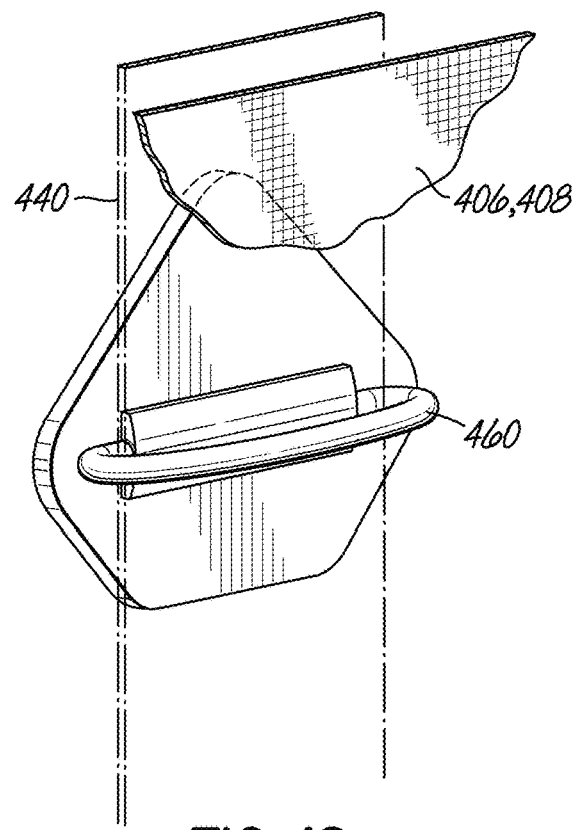
FIG. 12 is a detail schematic view of a coupling of the panels to the trailer of FIG. 10.

Referring now to FIG. 12, with continuing reference to FIGS. 10 and 11, the illustrated panels 406, 408 are further secured to the respective walls 412, 414, 416 via a plurality of intermediate straps 440 extending around the respective walls 412, 414, 416 of the trailer 404 and captured by tie down rings 460 attached to the walls 412, 414, 416, such as via adhesive. The panels 406, 408 may be removably attached to the intermediate straps 440 by any suitable fasteners, such as magnetic couplings described below. The intermediate strap(s) 440 proximate to the midpoints of the side panels 406 may have more slack as compared to the intermediate strap(s) 440 proximate to the front and rear ends of the side panels 406 and/or the front and rear straps 440 to assist in the inflation of the side panels 406 to achieve a desired configuration, such as the contoured profiles in the inflated or deployed states.

Figure 13:
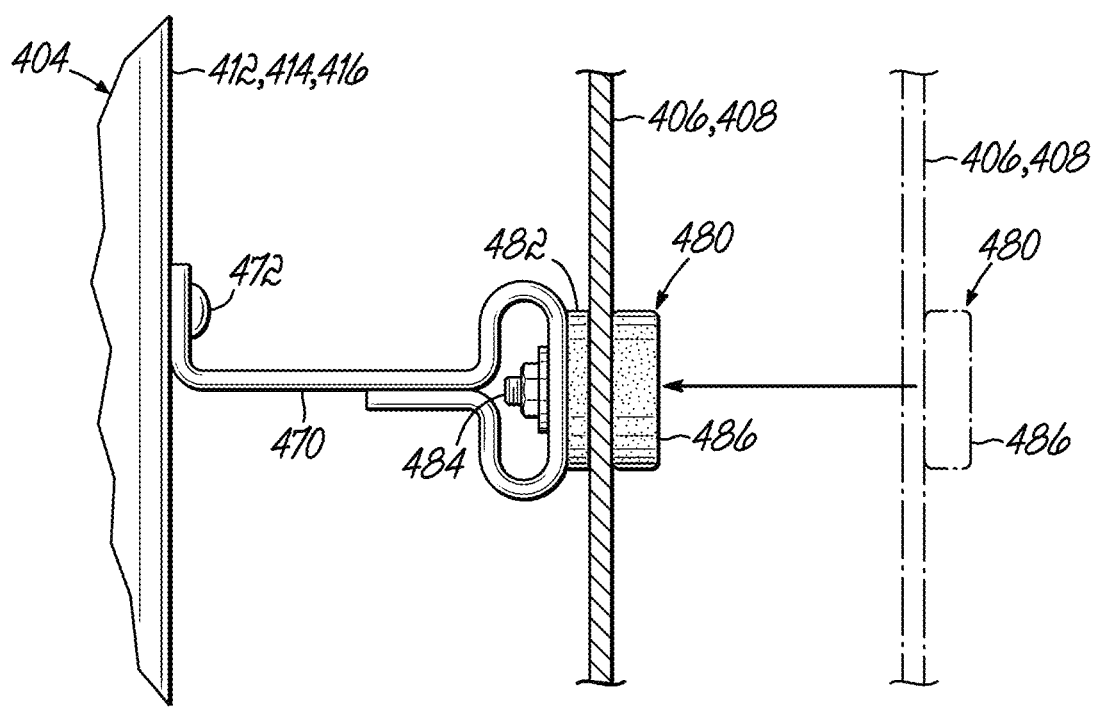
FIG. 13 is a detail schematic view of an alternative coupling of the panels to the trailer of FIG. 10.

Referring now to FIG. 13, with continuing reference to FIGS. 10-12, in another alternative embodiment, the panels 406, 408 may be secured to the respective walls 412, 414, 416 via a tie-down strap 470 secured to the wall 412, 414, 416, such as by a fastener 472, and a magnetic coupling 480. For example, the magnetic coupling 480 may include a first magnet 482 fixedly coupled to the tie-down strap 470, such as via a fastener 484, and a second magnet 486 that may be positioned over the respective panel 406, 408 on an opposite thereof to capture the panel 406, 408 between the first and second magnets 482, 486. Such magnetic couplings 480 may be positioned at various locations along the tie-down straps 470, as may be desired. The tie-down straps 470 proximate a midpoint of the trailer 404 may have lengths greater than those of the tie-down straps 470 proximate the ends of the trailer 404 to assist in achieving a desired inflated configuration of the panels 406, 408. Air influx may be achieved in a manner similar to that described above. In one embodiment, chains of various lengths (e.g., various numbers of similar links) may be used in place of such tie-down straps 470. For example, the first end of each chain may be coupled to a rod removably secured to a periphery of the trailer, such as via brackets, and the second end of each chain may be sewn to an interior side of the corresponding panel. When the trailer is at rest, the chains may sag under gravity. Upon sufficient air influx into the cavities between the panels and the respective walls of the trailer, the subsequent inflation of the panels may cause the chains to extend toward a taught state.

By constructing the deployable panels of fabric-based materials, the panels may be relatively lightweight. While the deployable panels have been described as having boxfish inspired topographies in the inflated or deployed state, the panels may have any other suitable topographies in the inflated or deployed state, such as sharkskin inspired topographies or boxfish and sharkskin inspired topographies.

EXAMPLE

Figure 14:
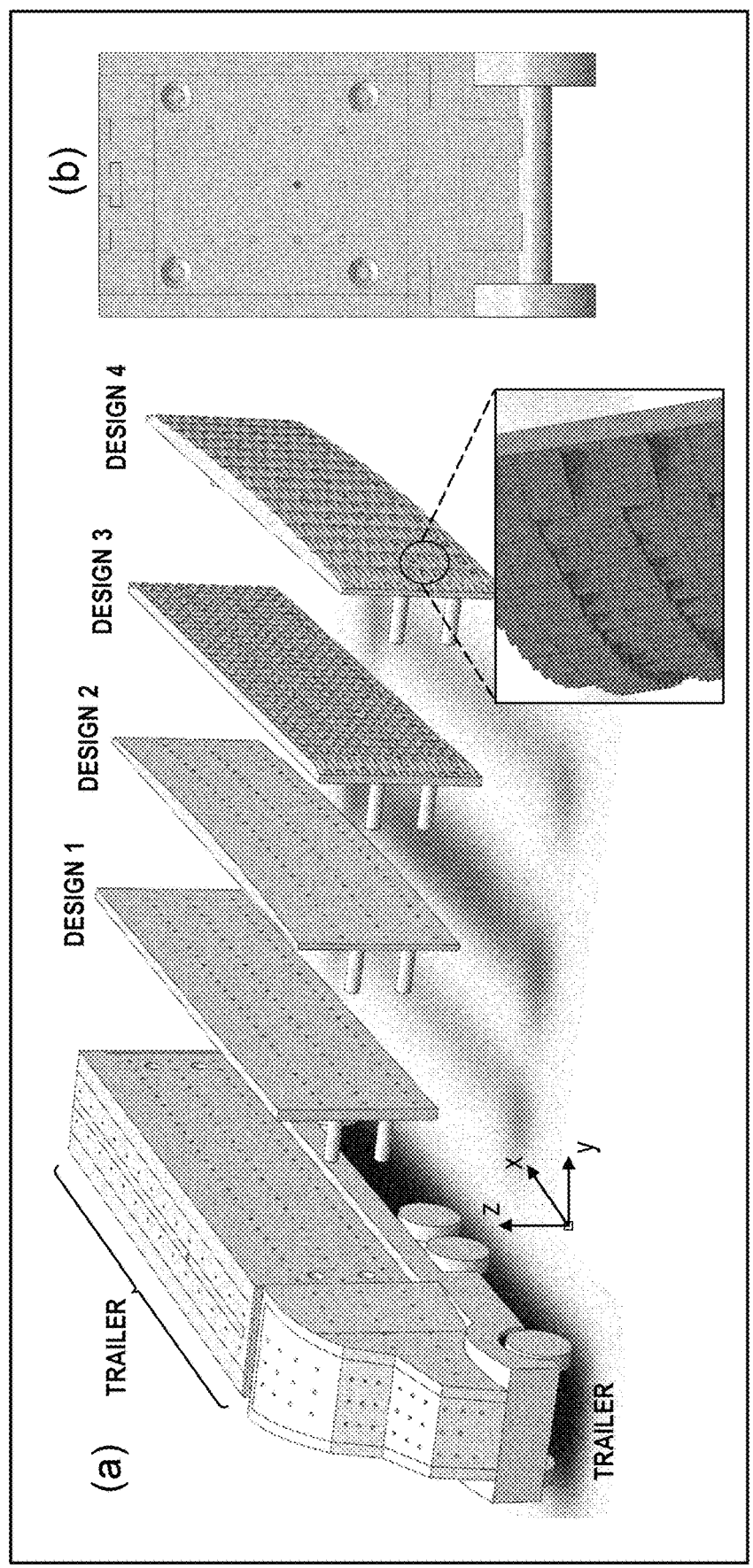
FIGS. 14-24 illustrate an exemplary scaled model of a tractor-trailer and experimental results associated therewith.

Referring now to FIG. 14, a 1:42 scaled model of class 8 tractor-trailer was 3D printed with polycarbonate as the working material using a Fortus 400mc 3D printer (Stratasys Ltd.). FIG. 14 illustrates a schematic of the tractor-trailer as seen from (a) isometric view and (b) back view. The geometry of tractor-trailer was designed to include roof fairings over the tractor which are present in most modern class 8 trucks. This base structure formed the reference-case for comparison to the new engineered bio-inspired structures that was evaluated for potential reduction in drag. The overall length, width, and height of the scaled model was 38 cm (15.10")×6 cm (2.40")×10 cm (4.00") respectively. The geometry of the tractor-trailer is similar to that shown in FIG. 1. Four different side wall panels with engineered and bio-inspired structures were evaluated for impact on drag. These four experimental and modeling designs for the trailer were:

Design 1: Flat trailer geometry without any retrofitted passive structures representing the control case i.e., the baseline structure that represents the prior art, as described above.

Design 2: Inspired from the streamlined body of a boxfish (*Ostracion meleagris*), the trailer morphology was contoured to impart a gradual curvature of overall radius, 200 cm (78.5"). The maximum protrusion was limited to 0.25 cm at exactly halfway across the length of the trailer from each side, thereby increasing the total width in this region from 6 cm to 6.5 cm or 8% increase. For a full scale trailer, this corresponds to a width increase from 2.52 m to 2.73 m. It is important to note that United States federal regulations have been flexible over the years, by increasing the maximum width of commercial motor vehicles (CMVs) from 2.44 m in 1956 to 2.6 m 1976, 6.5% increase. Given that maximum width of CMVs in states such as Hawaii is 2.74 m, the modified design dies fall within existing regulations.

Design 3: Passive structures inspired by shark scales (*Isurus oxyrinchus*) were added along the side walls of the trailer. Each individual structure was 1 cm (0.4") long×0.2 cm (0.08") wide×0.25 cm (0.1") high. A total of 700 such structures were stacked evenly across the trailer in a horizontal and vertical array of 28 and 25 structures respectively. The design was modified from a natural shark-skin to avoid challenges arising from fabricating large arrays of such structures while maintaining the geometrical aspects that permit fluid-structure interactions for drag reduction.

Design 4: Combining Design 2 and Design 3, the engineered shark-skin structures were patterned on the streamlined contour imparting hierarchical structure to the trailer. It was hypothesized that the hierarchical design would yield benefits for both designs toward drag reduction.

Experimental simulations using a wind tunnel and computer-based numerical simulations were performed which yielded the following results.

As an initial matter, it should be appreciated that fuel is consumed in a tractor-trailer to overcome motion related resistances leading to losses arising from (a) rolling resistance, (b) auxiliary equipment, (c) drive-train, and (d) aerodynamic drag. By suspending a stationary tractor-trailer inside the wind tunnel, it was possible to decouple the aerodynamic losses of trailer structures from all other (a-c) motion related losses. The measured drag force was non-dimensionalized and reported as drag coefficient, $C_d$ which for a bluff body of normal cross-sectional area A, travelling at streamwise free-stream velocity, $u_{free}$ along $\vec{x}$, is given as:

$$C_d = \frac{2F_d}{\rho u_{free}^2 A}.$$

where, $F_d$ is the measured drag force. $F_d$ was measured by varying the fan speed allowing air speed to range from 18-38 m/s (40-85 mph) and the resulting $C_d$ is reported in FIG. 15 for the scaled model. Overall, across the range of tested air speeds, $C_d$ was largest for Design 1 (baseline), followed by Design 3 (engineered shark-skin), and then Design 2 (boxfish), with Design 4 (combined boxfish and shark-skin) experiencing the least drag.

Specifically, at a free-stream velocity, $u_{free}$ of 38 m/s, for the 1:42 scaled model, $C_d$ for Design 1 (baseline) was the largest (0.62), followed by Design 3 ($C_d$=0.59; engineered shark-skin pattern). Streamlining the trailer (Design 2; boxfish) resulted in a reduced $C_d$ to 0.56 and finally adding hierarchy to the streamlined trailer (Design 4) resulted in $C_d$ of 0.54 compared to the baseline case, suggesting improvements to the state-of-the-art for the tractor-trailer, where a $C_d$ of 0.57 was reported using several add-on structures that are fundamentally different in functionality and geometry when compared against the present design.

Figure 15:
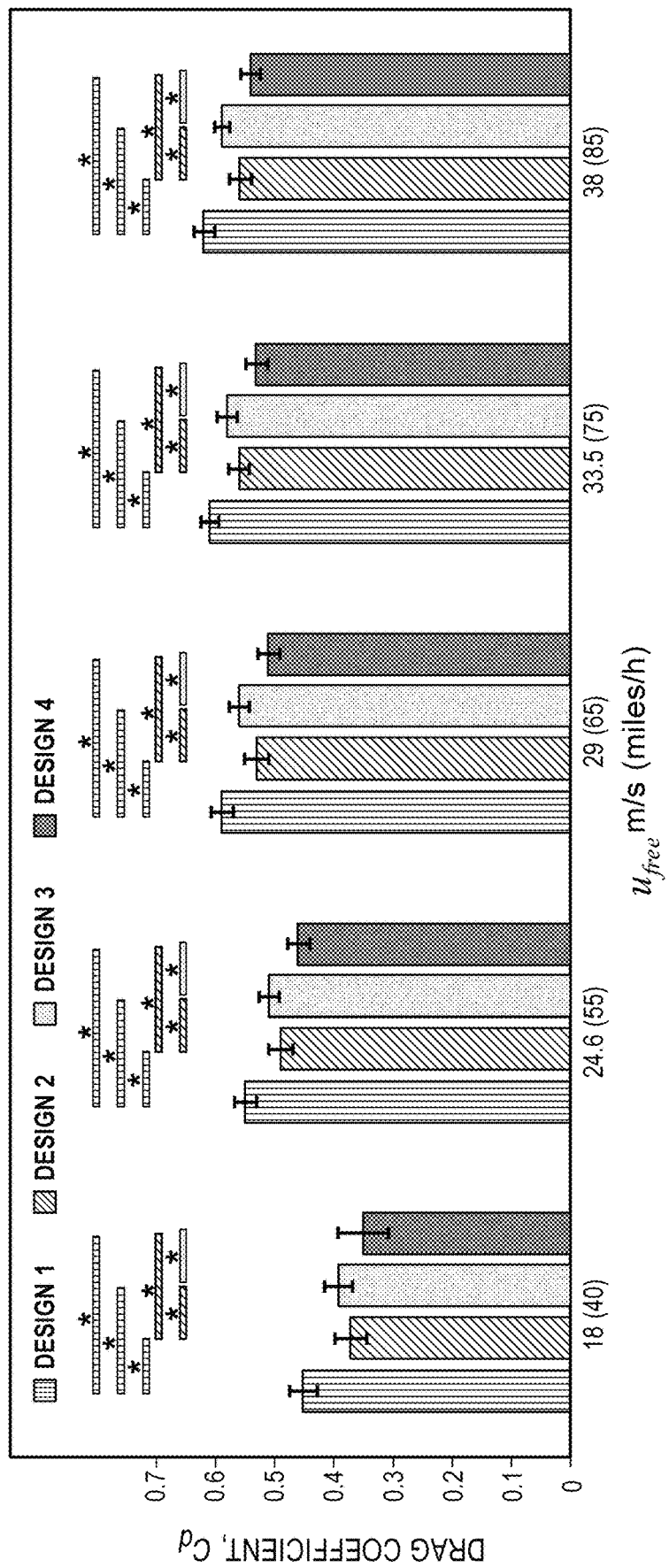

FIG. 15 is a bar graph showing experimentally measured drag coefficient for all the 4 designs considered in the present study. Compared to the baseline where no additional structure was retrofitted, streamlining and retrofitting shark-skin inspired structures showed up to 12.9% reduction in drag coefficient when tested at 38 m/s inside the wind tunnel. 2-sample t-test was conducted demonstrating statistical significance (denoted by the asterisk (*) with $p<0.01$) at all the tested speeds when compared between any of the two designs.

The aerodynamics of Design 1 (Baseline Model) will now be discussed.

Figure 16:
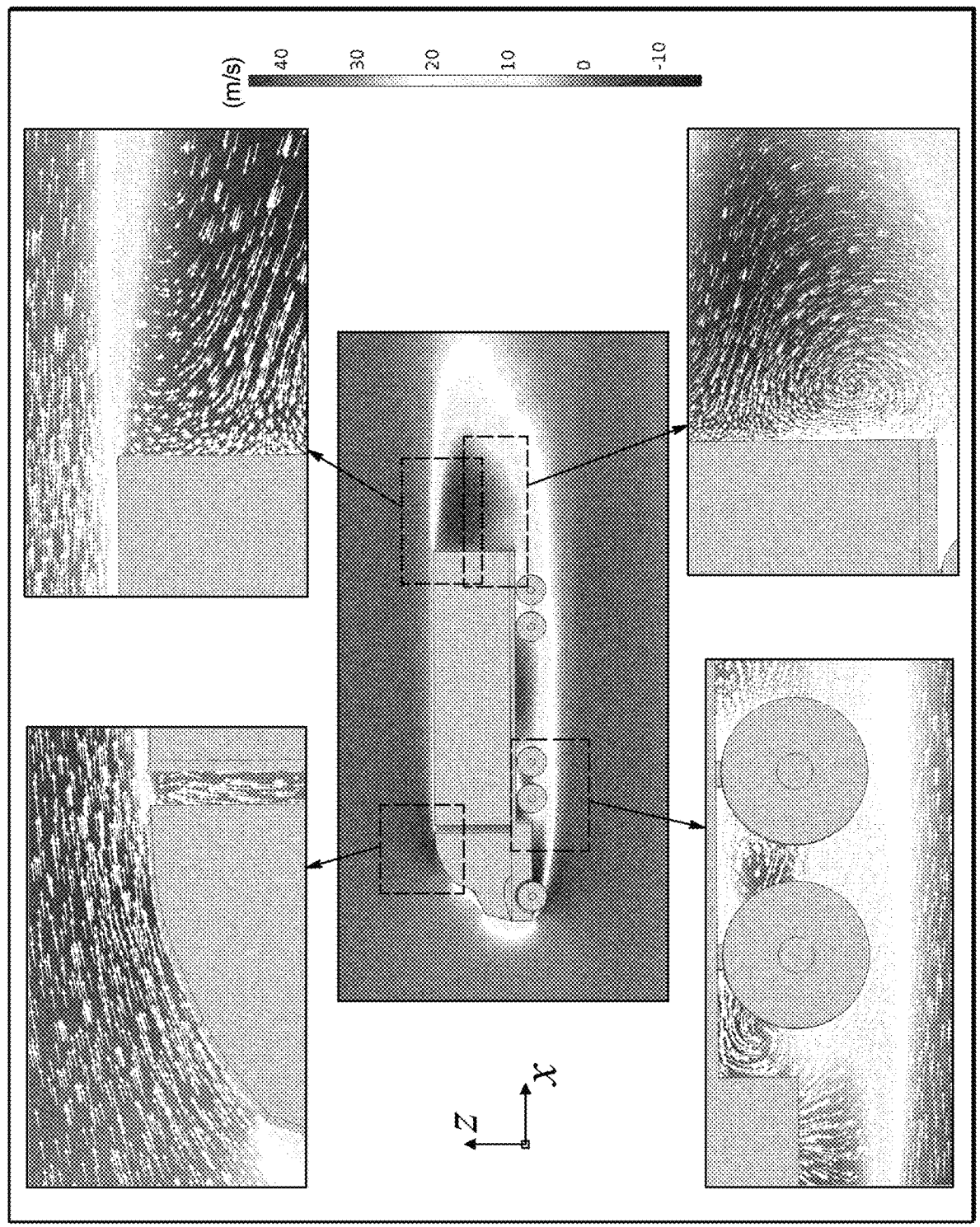
Figure 17:
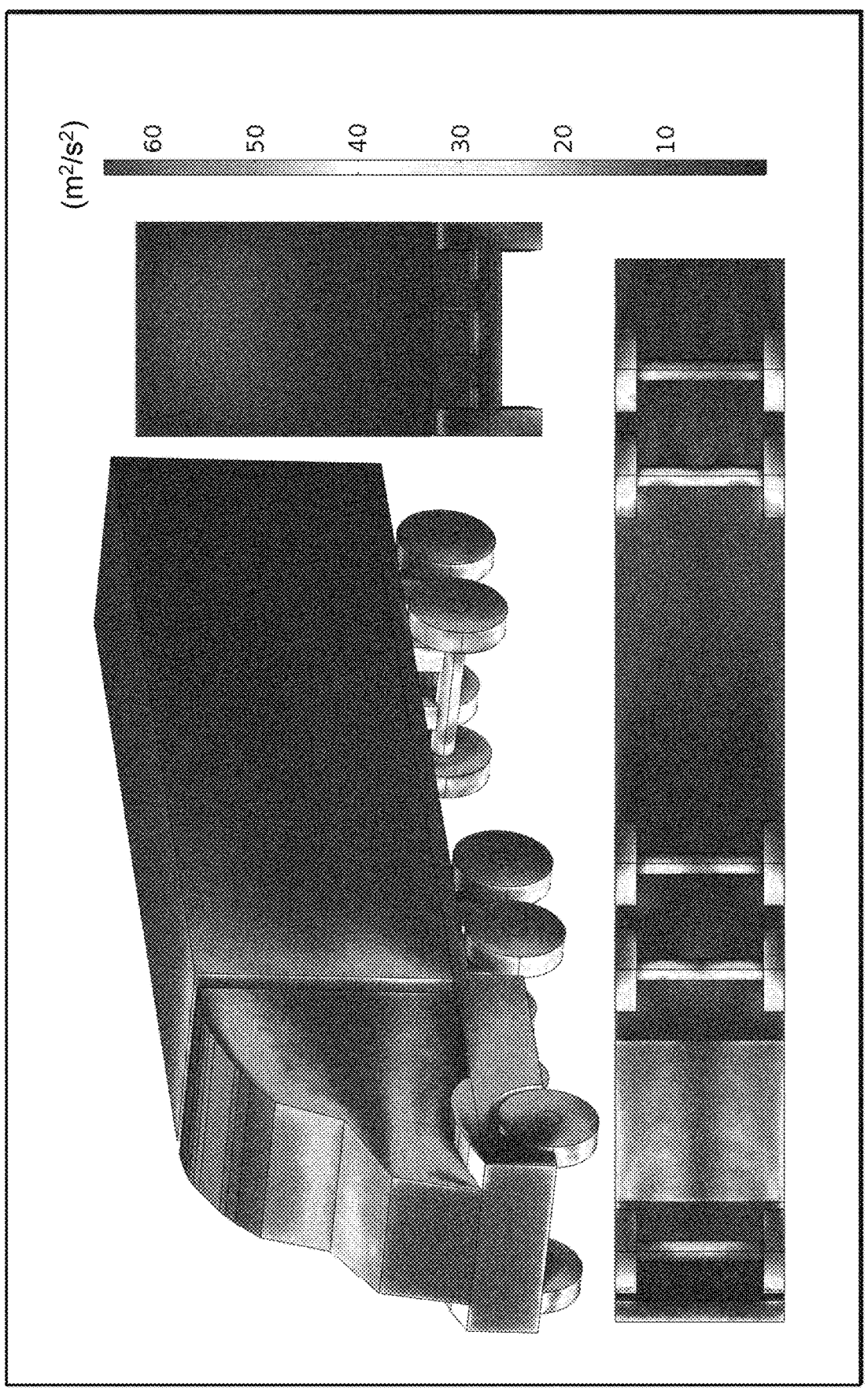
Figure 18:
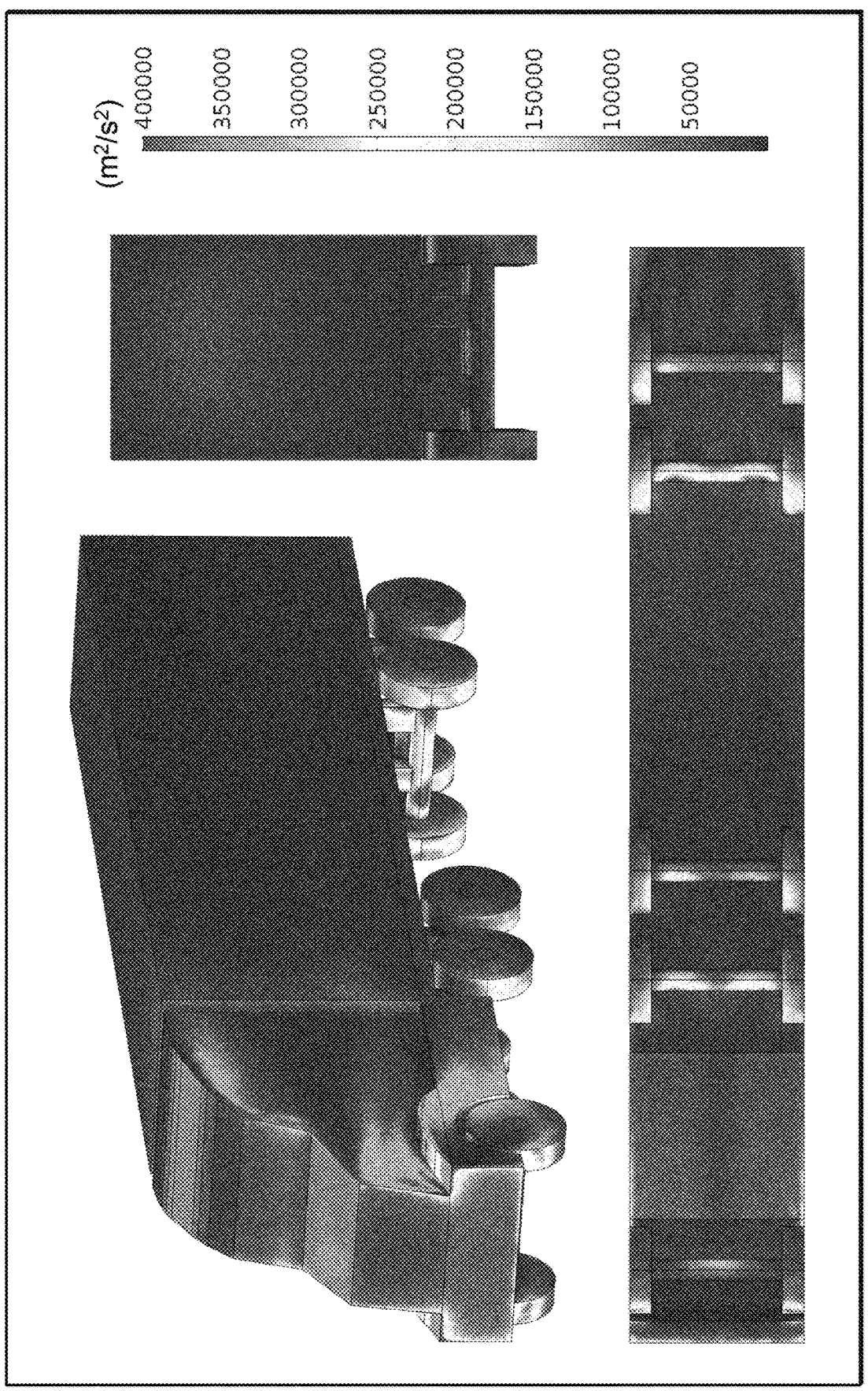

As the incoming air approaches the tractor-trailer, flow stagnation at tractor front results in a zone of elevated pressure. Velocity profiles and regions of local flow reversal are illustrated in FIG. 16 around the tractor-trailer were found to agree with trends reported from past numerical results. In particular, FIG. 16 shows velocity profile plotted at the tractor-trailer along the z-x plane. Direction of free-stream flow is along the x-axis. White arrows indicate direction of local flow. Regions of flow reversal included tractor-trailer gap, trailer wheels, and the trailer wake. In addition, the spatial distribution of turbulent kinetic energy and turbulent dissipation rate are illustrated in FIGS. 17 and 18, respectively.

Figure 19:
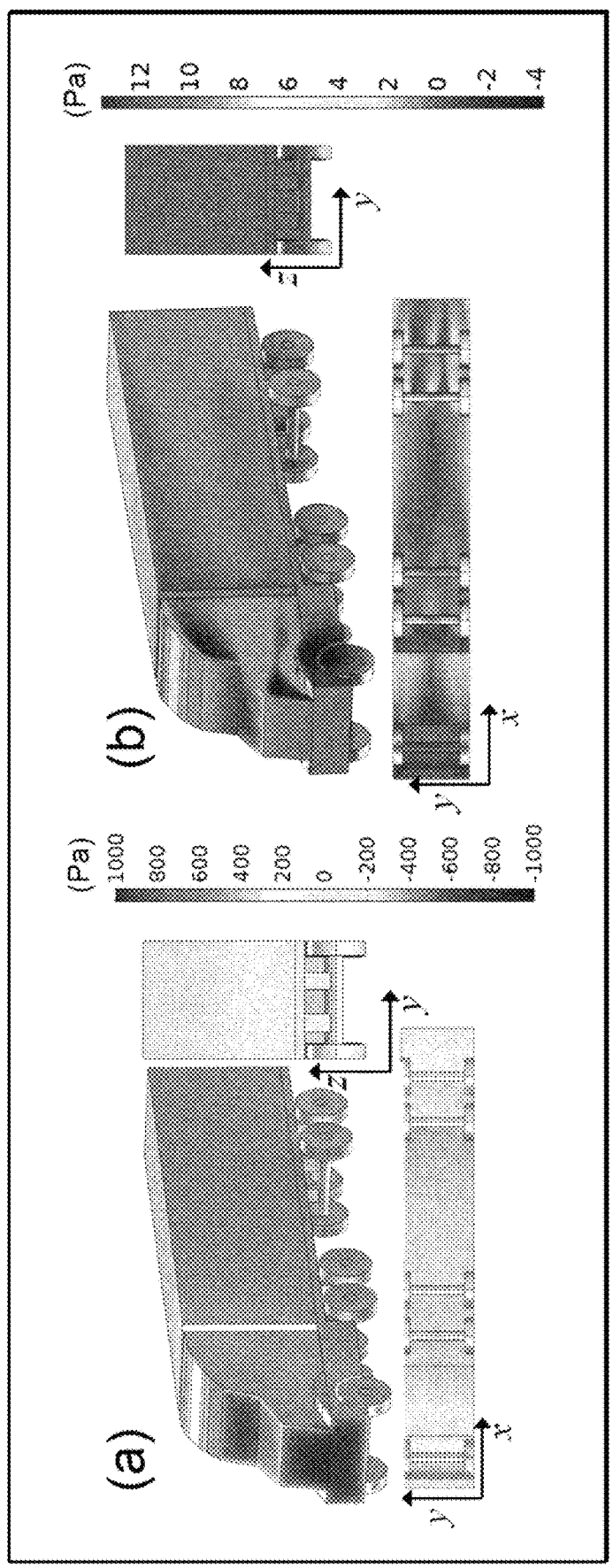

FIG. 19(*a*) illustrates the aerodynamic gage pressure (with respect to atmospheric pressure) distribution across the 1:42 scaled model of tractor-trailer measured at a flow speed of 38 m/s across various regions of the tractor-trailer. Due to flow stagnation, kinetic energy of the incoming air is converted to a net increase in pressure at the tractor front. Direction of the free-stream incoming air with respect to tractor-trailer is along the x-axis. FIG. 19(*b*) illustrates the stress distribution at the walls of the tractor-trailer showing that viscous stress contributes to about 1.2% of the total pressure indicating that pressure drag dominates over skin-friction drag at high Re for the tractor-trailer.

It is important to note that the measured pressure is the sum of pressure from the flow-field and the induced local streamwise shear stress at the wall, due to the gradients in local velocity. These individual components were decoupled using an in-built function in COMSOL. The magnitude of shear stress was 1.2% that of total pressure (FIG. 19(*b*)), and therefore the contribution of viscous effects at high Re flows ($>10^6$) are minimal and confined close to the wall. Since wall functions were used in the two equation turbulence models, the local wall shear stress was estimated as shown below, $$\vec{u_\tau} = \sqrt{\frac{\vec{\tau_w}}{\rho_{air}}}.$$

$$\tau_{w,x} = \rho_{air}\vec{u_\tau}\frac{u_{\tau,x}}{u^+}.$$

Here $\vec{u_\tau}, \vec{\tau_w}$ are the friction velocity and shear stress at the wall, $\tau_{w,x}$ is streamwise component of shear stress, $u_{\tau,x}$ is the streamwise tangential component of velocity, $u^+$ is the dimensionless tangential velocity.

Figure 20:
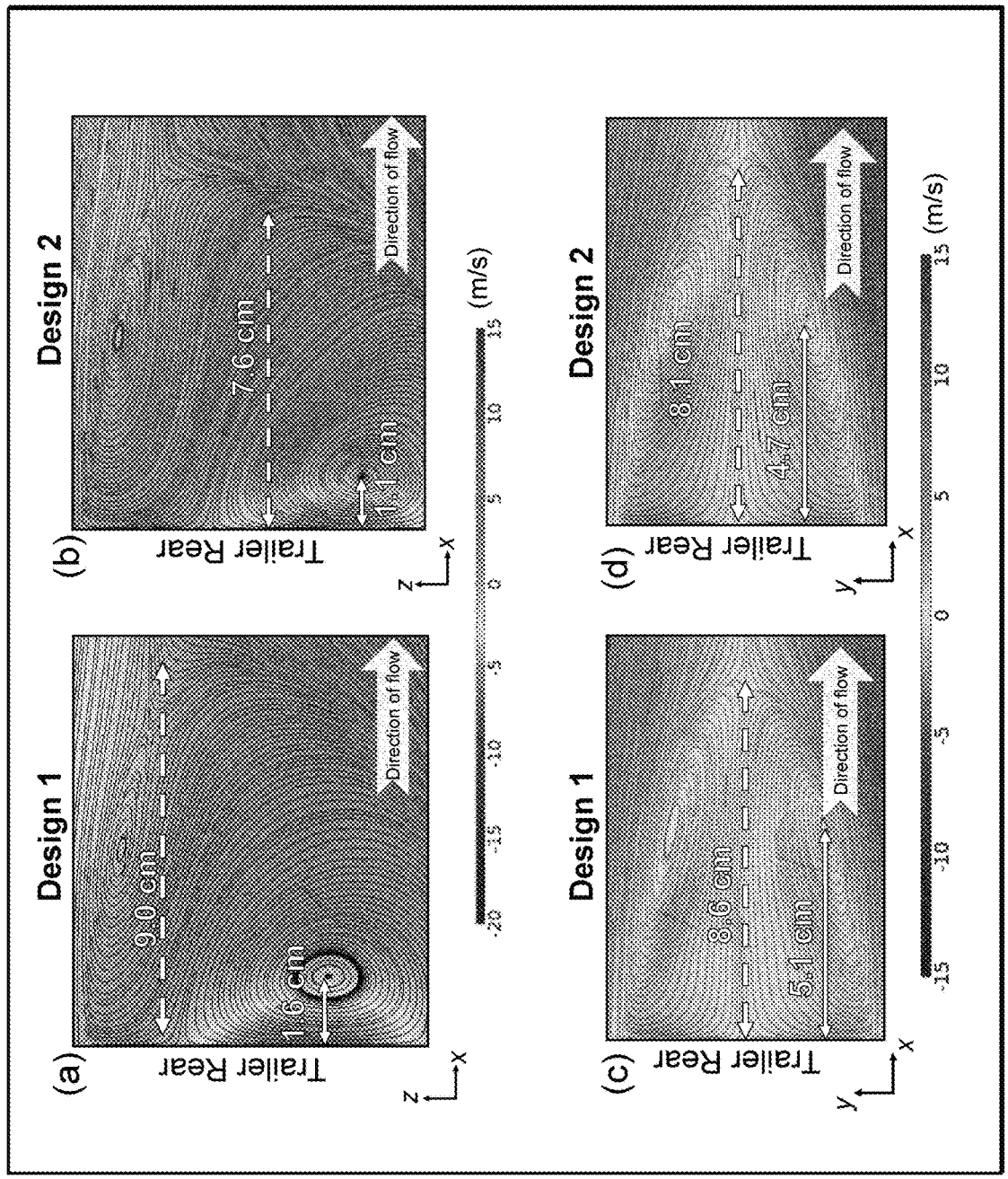

Next, as the incoming air stagnates at the tractor front and subsequently approaches the rear of the trailer, formation of eddies or recirculation zones due to flow separation is commonly observed in the wake (FIG. 20). Recirculation enhances mixing of faster moving fluid with the slower fluid in the shear layer, close to the trailer rear at the expense of loss in pressure, contributing to overall pressure drag. In addition to the streamwise velocity $\vec{u}$, along the x-axis, flow separation at the trailer rear also contributes to transverse flow, $\vec{v}$ (along the y-axis) and $\vec{w}$ (along the z-axis). Therefore, based on the spatial location in the wake, the magnitude of transverse velocity components $\vec{v}, \vec{w}$, can be anywhere between 40-50% of $u_{free}$ (FIG. 20), implying reduction in base pressure compared to the stagnation zone at the tractor front. As the flow proceeds further downstream from the trailer rear, the transverse component of velocity continues to decrease and at a certain distance downstream when transverse components of velocity become negligible and the streamwise velocity $\vec{u}$ finally increases back to $u_{free}$. This total distance between the rear of the trailer to where the flow re-combines to $u_{free}$ is called the recirculation length, $l_r$.

The drag reduction in Design 2 (Boxfish Inspired) will now be discussed.

A quantitative comparison of the changes to wake recirculation for the boxfish inspired Design 2 with respect to Design 1 is discussed next for 1:42 scaled model. In Design 1, the wake recirculation, along x-z plane was centered at a distance of 1.6 cm from the rear of the trailer, resulting in a net recirculation length, $l_r$ of 9 cm (FIG. 20*a*). The wake recirculation for Design 2 was centered at a distance of 1.1 cm from the trailer rear resulting in a 30% reduction in comparison to Design 1 (FIG. 20*b*). As a result, the total recirculation length, $l_r$ was reduced to 7.6 cm or a 15.5% reduction in comparison to the base case. Similarly, along x-y plane, $l_r$ was reduced by 6% for Design 2 in comparison to Design 1 (FIG. 20*c, d*). Quantifying $l_r$ has been of engineering interest and have been used as a metric in the past where embedded vortex-generators at the trailer-front, reduced the wake-recirculation length by up to 10%, resulting in decreased $C_d$.

As shown in FIG. 20, for the 1:42 scaled model, numerically estimated local streamlines at the trailer rear (wake) region plotted for (a) Design 1 and (b) Design 2 along the x-z plane, with legend indicating transverse velocity, $\vec{w}$. Dashed lines indicate recirculation length, $l_r$ and solid lines indicate the center of the wake recirculation. The addition of bio-inspired morphology in Design 2 reduced the recirculation length, $l_r$ in the wake by 15.5% in the x-z plane comparison to Design 1. Similarly, the streamlines are plotted in the x-y plane, with legend indicating transverse velocity $\vec{v}$ for (c) Design 1 and (d) Design 2 showed that morphology of Design 2 reduced the recirculation length by ~6%.

Figure 21:
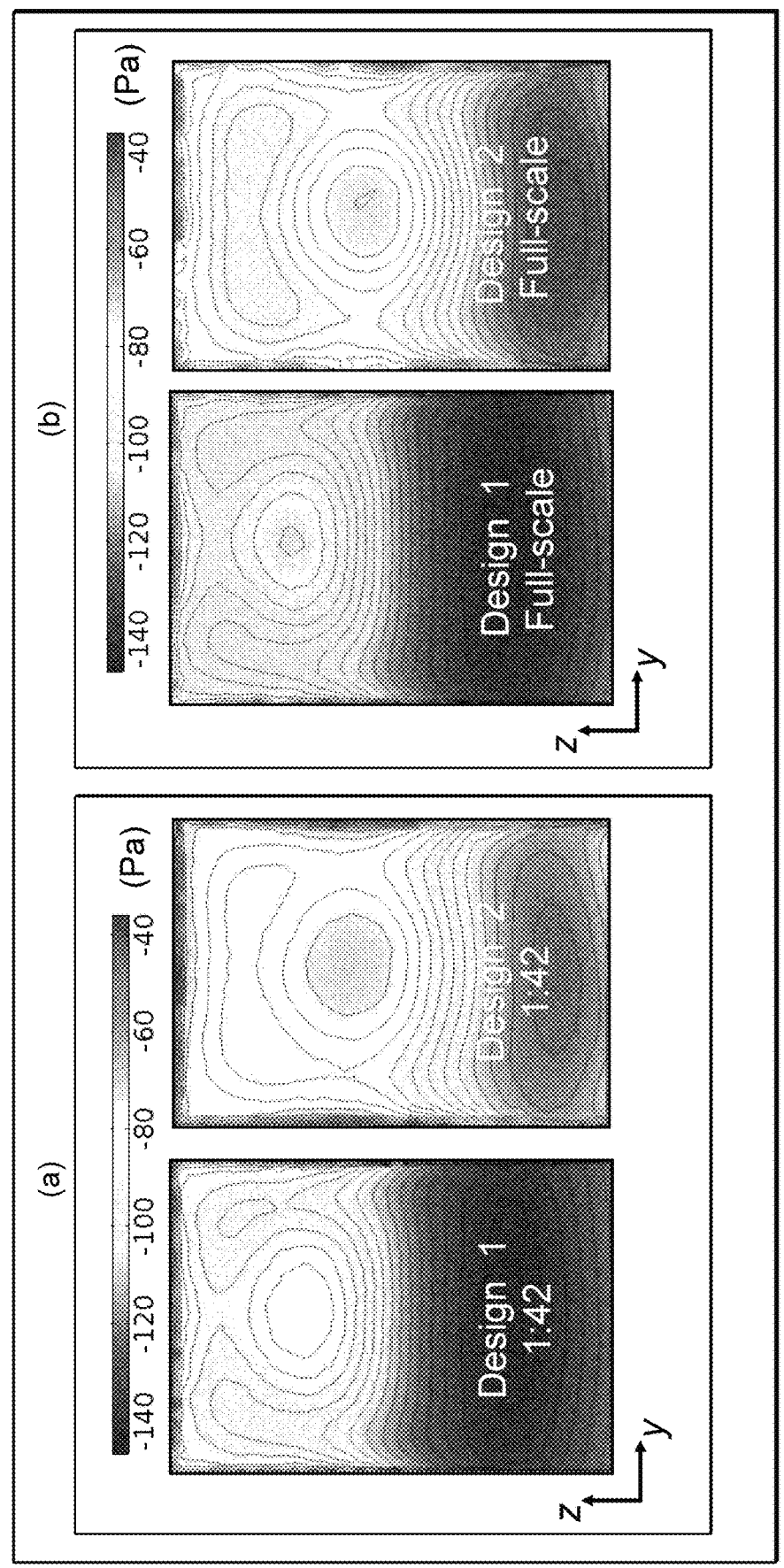

The reduction in $l_r$, reduces mixing in the separated shear layers immediately at the wake, increasing trailer base pressure, thereby reducing the total pressure drop experienced between the front and rear of the tractor-trailer and consequently reducing net drag force. Specifically, for the 1:42 scaled model, an average trailer rear pressure of −93 Pa was estimated for Design 2 (FIG. 21*a*) in comparison to −113 Pa in Design 1 (FIG. 21*a*). This recovery in trailer wake pressure (~20 Pa) facilitates a 10% reduction in $C_d$ as was also observed experimentally (FIG. 15). In order to test the ability for such a design implementation for a full-scale model, the tractor-trailer geometry was scaled up by a factor of 42 isometrically in the numerical model. In this scenario, the average trailer rear pressures for Design 1 and Design 2 were estimated to be −120 Pa and −98 Pa respectively (FIG. 21*b*). Therefore, an increase in base pressure for Design 2 in comparison to Design 1 was observed for both scaled and full-scale models. FIG. 21 illustrates the numerically estimated time averaged trailer rear pressure for Design 1 and Design 2 plotted for (a) 1:42 scaled and (b) full-scale (1:1) model. Reduction in wake recirculation in Design 2 increased the average base pressure by 20 Pa for 1:42 model and 22 Pa for full-scale tractor-trailer model in comparison to Design 1.

Figure 22:
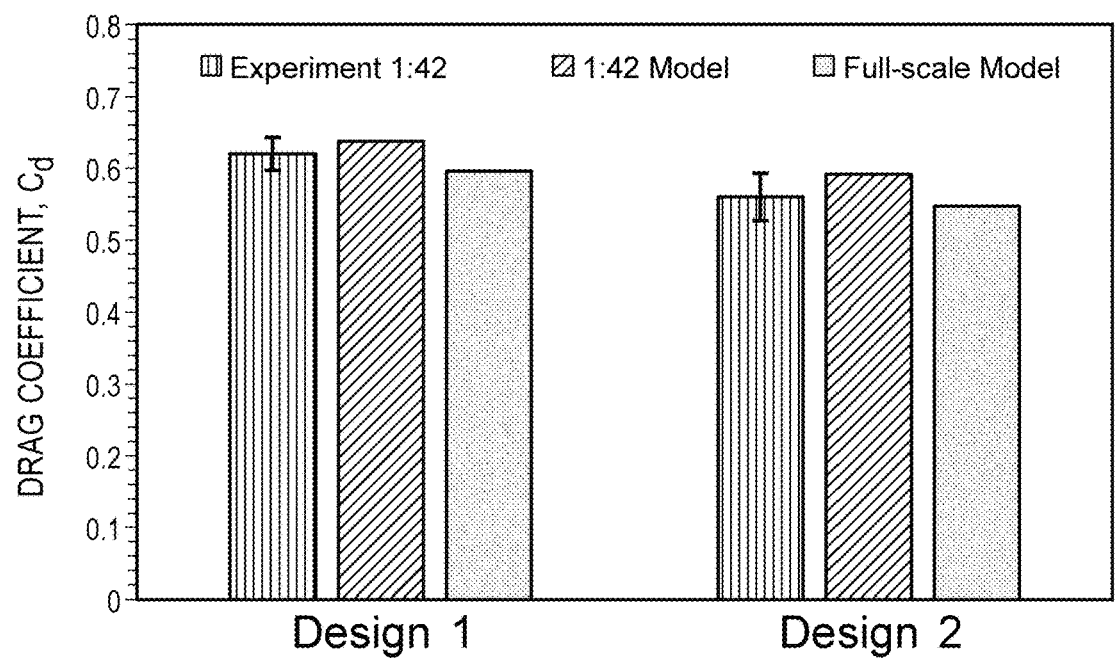

It will be appreciated that in order to achieve full similarity between the model and full-scale simulations, it is typically important to achieve geometric, kinetic, and dynamic similarity. Since the model was scaled up isometrically 42 times, geometric similarity was achievable. Kinematic similarity was also achieved as the free stream flow velocity, $u_{free}$ was same (38 m/s) in both the scaled and full-scale simulation. However, dynamic similarity could not be achieved as the Re for the scaled model was 42 times smaller than full scale model in the simulations, implying incomplete similarity exists between the exerted fluid forces in the 1:42 scaled and full-scale model. FIG. 22 shows the numerically estimated drag coefficient, $C_d$, for both the scaled and full-scale models, compared against experimental results. As shown, numerically estimated net drag coefficient for both 1:42 and 1:1 model is within experimental uncertainty of $C_d$ measured from the wind-tunnel measurements at 38 m/s. For comparison, experimental drag coefficient (purple bar) is reproduced from FIG. 15.

Numerical simulations were in agreement with experimental results, as the estimated $C_d$, for both the 1:42 scaled model and full-scale model fell within experimental uncertainty for both Design 1 and Design 2. FIG. 22 shows that the drag coefficient is independent of Re, implying feasibility in extrapolating the scaled model results to a full-scale system as the pressure distribution remains similar across the tractor-trailer as shown in FIG. 21, despite incomplete similarity in the numerical solutions. Importantly, experimentally estimated drag coefficient (FIG. 15) was also seen to plateau to a constant $C_d$ at higher tested speeds (>55 mph) for all the four designs, demonstrating Re independence, in agreement with past results in the literature that show $C_d$ remains unchanged even for simpler geometries such as rough cylinders (roughness=0.5% cylinder diameter), when Re was beyond $\sim 5 \times 10^5$. Therefore, for fully turbulent flows, achieving dynamic similarity is not necessary at Reynolds numbers where the flow is fully turbulent, provided geometric and kinematic similarity is achieved.

Design 3 (Engineered Shark-skin Structures) and Design 4 (Hierarchical Combination of Designs 2 and 3) will now be discussed.

Figure 24:
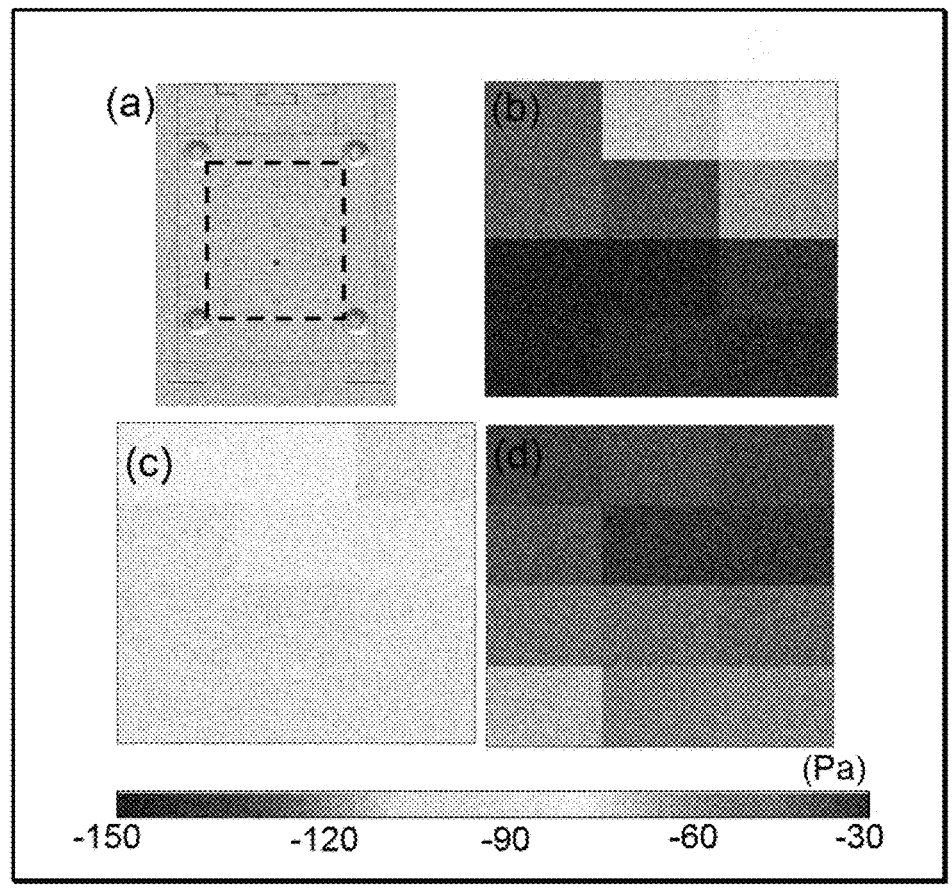

The shark-skin like structures in Design 3 were designed to mimic the flow dynamics including local pressure distribution (FIG. 23a) and boundary layer characteristics (FIG. 23b) of a predator fish that aids in its physiological function and hydrodynamic transport. The thickness and shape of the boundary layer profiles in particular is dependent on cumulative interaction of several parameters, namely: the bluff-body shape, surface roughness, type of fluid (Newtonian or non-Newtonian), and the local Re. The drag reduction capabilities of engineered shark-skin structures considered are next analyzed in relation to the pressure gradients and boundary layer characteristics across the trailer, and the resulting vorticity and trailer base pressure distribution that ultimately result in a reduction in drag coefficient is discussed (FIG. 24).

Figure 23:
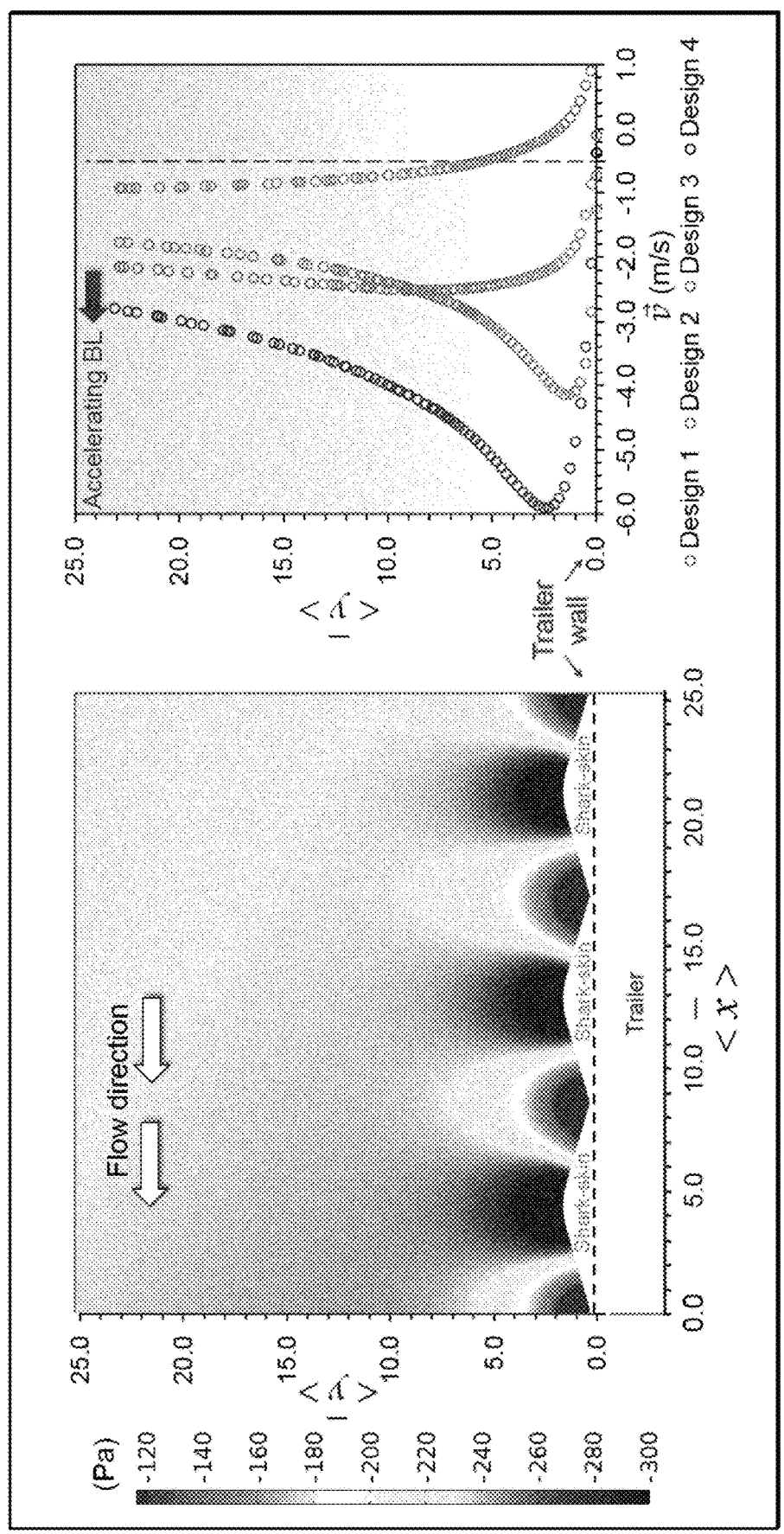

FIG. 23a depicts the pressure variation across the troughs and peaks along the trailer walls of Design 3. Relative to the atmosphere, a maximum and minimum gage pressure of −120 Pa and −300 Pa is estimated at the troughs and peaks of the add-on structure respectively, thus generating a favorable pressure gradient along the flow direction (FIG. 23a). This leading edge-suction is also attributed to promote a drag-reduction in sharks. Pressure gradients, in general dictate the characteristic of the boundary layer over a surface. Favorable pressure gradients facilitate the development of an accelerating boundary layer, inhibiting flow separation, and reducing drag. In contrast, unfavorable pressure gradients decelerate the flow, causing flow reversal close to the wall, ultimately leading to boundary layer separation from the surface, thus stalling the flow.

Estimation of the transverse or normal component of fluid velocity from the wall provides insight on classifying the type of boundary layer (accelerating or decelerating) observed. Here, the normal velocity, $\vec{v}$ to the trailer side walls is along the y-axis as observed from FIG. 14. An accelerating boundary layer is then characterized by the normal velocity being negative at the edge of the boundary layer, implying net influx of air into the boundary layer close to the walls. FIG. 23b plots the $\vec{v}$-profile distribution along y-axis i.e., normal to the surface of the trailer, at the rear of the trailer. Here, the normal distance from the surface is non-dimensionalized and plotted as $\langle \bar{y} \rangle$ by dividing with 0.2 cm, which is the smallest dimension of the additive structure, critical to the flow characteristics in Design 3.

FIG. 23(a) illustrates spatial variation of pressure distribution near the retrofitted structure in Design 3 showing pressure gradients along the across troughs and peak. Favorable pressure gradients promote accelerating boundary along long the direction of flow delaying flow separation. FIG. 23(b) illustrates the $\bar{v}$-profile distribution in the boundary layer away from the surface of the trailer for all designs are negative in magnitude at the outer edge of the boundary layer indicative of accelerating boundary layers.

At $\langle \bar{y} \rangle = 0$ or at the trailer surface (FIG. 23(a)), normal velocity $\vec{v}$ is negligible for all the designs (FIG. 23(b)). However, the $\vec{v}$-profile differs for Design 1, when compared to Designs 2, 3, and 4. In Design 1, magnitude of $\vec{v}$ is positive to $\langle \bar{y} \rangle = 1.5$, reaching a maximum positive velocity of +1 m/s at $\langle \bar{y} \rangle = 0.25$. This implies that close to the surface, transverse velocity is directed towards the outer-edge of the boundary layer, and indicative of unfavorable pressure gradients leading to flow deceleration close to the surface, leading to the formation of a larger recirculation zone at the trailer wake compared to all the designs (cf. FIG. 20). At the outer edge of the boundary layer, at $\langle \bar{y} \rangle = 23$, $\vec{v}$ reaches a value of −0.92 m/s implying a change in the accelerative behavior of the boundary layer. Change in polarity of $\vec{v}$ in Design 1, is indicative of strong re-circulation in the boundary layer and subsequently the magnitude of vorticity for the base case was estimated to be 14,650 $s^{-1}$.

In contrast to Design 1, $\vec{v}$ is most negative at a value of −5.90 m/s for the hierarchical Design 4 at $\langle \bar{y} \rangle = 2.5$, followed by Design 3 with $\bar{v} = -4.13$ m/s at $\langle \bar{y} \rangle = 1.5$, and Design 2 with $\vec{v} = -2.5$ m/s at $\langle \bar{y} \rangle = 8.3$. Therefore, close to the surface, the shark-skin inspired designs, Design 3 and Design 4, accelerate the flow in comparison to Design 1 and Design 2. However, at the outer-edge of the boundary layer, Design 4 constitutes maximum negative transverse velocity, $\vec{v}$ with magnitude of −2.74 m/s, followed by Design 2 with $\vec{v} = -2.14$ m/s and finally, $\vec{v} = -1.77$ m/s for Design 3. The magnitude of vorticity at the surface ($\langle \bar{y} \rangle = 0$) while maximum for Design 1 was followed by Design 2 (13,800 $s^{-1}$), Design 3 (10,750 $s^{-1}$), with Design 4 experiencing the least surface vorticity of 9,650 $s^{-1}$ (34% lesser compared to Design 1) minimizing pressure losses along the trailer wall.

FIG. 24(a) is a schematic showing pressure taps at the trailer wake where pressure was recorded and reported for (b) Design 1, (c) shark-skin inspired Design 3 and (d) Hierarchical structure as in Design 4. Maximum recovery of 15.9% increase in trailer base pressure is observed in hierarchical Design 4 in comparison to Design 1, contributing to a drag coefficient reduction of 12.9%.

While $\vec{v}$-profile is negative throughout the boundary layer for Designs 2, 3, and 4, it is evident that Design 4 follows benefits from the accelerating boundary layer characteristics of Design 3, (while shedding the least dissipative energy due to vorticity) close to the surface and Design 2 at the outer edge of the boundary layer (FIG. 23(b)), thereby effectively reducing the most drag amongst all the designs evaluated here. Since the flow was predominantly along the x-y plane, magnitude of $\vec{w}$ was negligible compared to magnitude of $\vec{v}$ along the trailer. The experimentally measured pressure distribution at the rear of the trailer surface (FIG. 24(a)) as plotted in FIG. 24b-d shows that compared to the baseline case or Design 1 (FIG. 24(b)), experimentally estimated base pressure was higher by 8.1% and 15.9% for Design 3 (FIG. 24(c)) and Design 4 (FIG. 24(d)) respectively, with Design 2 pressure distribution discussed previously (FIG. 21). While the resolution or the coarseness of the pressure map plotted at the trailer rear (FIG. 24(b-d)) is limited by the tap size and pressure sensor spacing, the results quantitatively report the pressure variations across the tested designs while confirming the mechanistic predictions of the numerical trends reflected by changes in velocity profile leading to a net change in pressure and hence reduced aerodynamic drag. Recovery in the base pressure in addition to the accelerating boundary layer as the flow approaches the wake directly contributes to reduction in the net drag experienced, thereby decreasing the drag coefficient. The measured drag coefficient, $C_d$ of 0.54, estimated for Design 4 (FIG. 15), in comparison to 0.64 for the baseline case (FIG. 15), results in a maximum drag reduction of 12.9%.

In conclusion, an experimental and numerical investigation of a class 8 tractor-trailer was conducted to test the drag-reduction capabilities of biologically-inspired trailer retrofits. To reduce the overall aerodynamic drag, the trailer morphology was re-designed from the state-of-art baseline (Design 1) to impart (a) boxfish-inspired design (Design 2), (b) an array of biologically-inspired but engineered shark-skin structures (Design 3) and (c) a hierarchical structure that combines streamlining contours with the engineered shark-skin (Design 4). Measurement of drag coefficient was conducted for all the four designs inside a wind-tunnel. Complementing numerical models, solved for both 1:42 and 1:1 scaled models indicated a recovery of wake pressure in all the three modified designs, with a maximum of 12.9% reduction in drag coefficient demonstrated for the hierarchical Design 4.

Considering the maximum drag reduction reported here (Design 4), lowering the drag coefficient by 12.9% for a full-scale class 8 tractor-trailer will be equivalent to approximately 8% in fuel savings beyond existing state-of-art commercial vehicles in use today. 8% in fuel savings can be correlated to a saving of ~$1700-$2400 for each class 8 truck annually. Given that there are nearly 2.5 million heavy duty ground fleet vehicles (i.e., the class 8 trucks) in the United States, such fuel savings from drag reduction could potentially lead to $4-$6 billion (1.6-2.3 billion gallons of diesel) savings annually, in addition to lowering emissions and ultimately moving forward to meet the emission standards set by NHTSA.

While the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. An apparatus for reducing aerodynamic drag on a tractor-trailer comprising:
    a panel configured to extend along a length of the trailer, the panel having first and second ends and being contoured along a lengthwise direction of the panel from the first end to the second end
    wherein a profile of the panel is defined by a shape of partial circumference of a circle of constant radius of curvature, and
    wherein the radius of curvature is between approximately 83 m and approximately 84 m.

2. A trailer including the apparatus of claim 1.

3. An apparatus for reducing aerodynamic drag on a tractor-trailer comprising:
    a panel configured to extend along a length of the trailer, the panel including a base extending between first and second ends and further including an array of rib-like protrusions extending outwardly from the base
    wherein the array includes a first row of a plurality of the rib-like protrusions aligned in a horizontal direction and second row of a plurality of the rib-like protrusions aligned in the horizontal direction,
    wherein each rib-like protrusion has a contour along a lengthwise direction of the base from the first end to the second end, and
    wherein the contour of at least two of the rib-like protrusions in the first row is staggered from the contour of at least two adjacent rib-like protrusions in the second row in a vertical direction.

4. The apparatus of claim 3, wherein the array includes approximately 25 rows of the rib-like protrusions.

5. The apparatus of claim 3, wherein the protrusions each have a length, a width, and a height, and wherein the lengths of the protrusions are greater than the respective widths and heights.

6. The apparatus of claim 5, wherein the lengths of the protrusions are between approximately 0.4 m and approximately 0.42 m and wherein the heights of the protrusions are between approximately 0.092 m and approximately 0.105 m.

7. The apparatus of claim 3, wherein the protrusions extend outwardly from the base by between approximately 0.07 m and approximately 0.084 m.

8. A trailer including the apparatus of claim 3.

9. An apparatus for reducing aerodynamic drag on a tractor-trailer comprising:
    a panel including an inner portion and an outer portion coupled to each other along first and second seams to define a cavity and further including at least one air inlet proximate at least one of the first or second seams for allowing air influx into the cavity from free-stream air flow during transit of the tractor-trailer to transition the panel from a retracted state to a deployed state,
    wherein, when in the deployed state, the panel is configured to alter an external topography of the tractor-trailer.

10. The apparatus of claim 9, wherein, when in the deployed state, the outer portion of the panel is contoured along a lengthwise direction of the panel.

11. A trailer including the apparatus of claim 9.

12. A trailer comprising:
a plurality of walls extending between respective front and rear ends and at least partially defining an interior cargo space;
at least one panel coupled to at least one of the walls and spaced apart therefrom to define at least one cavity and at least one air inlet proximate at least one of the respective front ends for allowing air influx into the at least one cavity from free-stream air flow during transit of the tractor-trailer to transition the respective at least one panel from a retracted state to a deployed state,
wherein, when in the deployed state, the at least one panel is configured to alter at least one external topography of the trailer without changing the interior cargo space.

13. The trailer of claim 12, wherein, when in the deployed state, the panel is contoured along a lengthwise direction of the panel.

14. The trailer of claim 12, wherein the at least one panel includes first and second side panels coupled to first and second sidewalls of the plurality of walls and spaced apart therefrom to define first and second side cavities, and wherein the at least one panel further includes a top panel coupled to a top wall of the plurality of walls and spaced apart therefrom to define a top cavity and the at least one air inlet proximate the front end of the top wall.

15. The trailer of claim 14, wherein the top panel is spaced apart from the top wall proximate the front end of the top wall by at least one standoff protruding outwardly from the top wall.

16. The trailer of claim 15, further comprising a front strap extending around the sidewalls and the at least one standoff proximate the respective front ends, wherein the side panels and the top panel are each coupled to the front strap.

17. The trailer of claim 16, further comprising a rear strap extending around the sidewalls and the top wall proximate the respective rear ends, wherein the side panels and the top panel are each coupled to the rear strap to inhibit air outflux from the respective cavities.

* * * * *